United States Patent
Gabbamonte et al.

(10) Patent No.: US 12,111,843 B2
(45) Date of Patent: Oct. 8, 2024

(54) SYNCHRONIZATION OF DATA ACROSS DIFFERENT ONTOLOGIES

(71) Applicant: Palantir Technologies Inc., Denver, CO (US)

(72) Inventors: Natacha Gabbamonte, Brooklyn, NY (US); Michal Adamczyk, New York, NY (US); Vipul Shekhawat, Palo Alto, CA (US)

(73) Assignee: Palantir Technologies Inc., Denver, CO (US)

( * ) Notice: Subject to any disclaimer, the term of this patent is extended or adjusted under 35 U.S.C. 154(b) by 7 days.

(21) Appl. No.: 17/845,324

(22) Filed: Jun. 21, 2022

(65) Prior Publication Data
US 2023/0103939 A1    Apr. 6, 2023

Related U.S. Application Data

(60) Provisional application No. 63/252,126, filed on Oct. 4, 2021.

(51) Int. Cl.
*G06F 16/27* (2019.01)

(52) U.S. Cl.
CPC .................................. *G06F 16/27* (2019.01)

(58) Field of Classification Search
None
See application file for complete search history.

(56) References Cited

U.S. PATENT DOCUMENTS

| | | | | |
|---|---|---|---|---|
| 7,634,482 | B2* | 12/2009 | Mukherjee | G06Q 10/10 |
| 2005/0097111 | A1* | 5/2005 | Mukherjee | G06Q 10/10 |
| 2007/0118394 | A1* | 5/2007 | Cahoon | G06Q 50/01 |
| | | | | 705/1.1 |
| 2018/0285201 | A1 | 10/2018 | Bangalore et al. | |
| 2021/0124729 | A1* | 4/2021 | Egorenkov | G06F 16/27 |
| 2022/0399086 | A1* | 12/2022 | Simons | G16H 10/20 |
| 2023/0103939 | A1* | 4/2023 | Gabbamonte | G06F 16/27 |
| | | | | 707/634 |

(Continued)

OTHER PUBLICATIONS

Extended European Search Report dated Feb. 7, 2023, issued in related European Patent Application No. 22199660.6 (16 pages).

*Primary Examiner* — Kim T Nguyen
(74) *Attorney, Agent, or Firm* — Sheppard Mullin Richter & Hampton LLP

(57) ABSTRACT

A first computing system and methods are provided for synchronizing data with a second computing system. The computing system receives an indication of an origination of data within the first database of the first computing system. A data object that includes attributes of the originated data is generated. A first instance of the data object is incorporated into a first ontology of the first database. A second instance of the data object is transmitted to the second computing system. During the transmission, the second instance of the data object is incorporated into a second ontology of a second database within the second computing system. An update to the second instance of the data object is detected. An updated ontological representation of the updated second instance is generated, or an updated ontological representation is received from the second computing system. The updated ontological representation is incorporating into the first ontology.

20 Claims, 13 Drawing Sheets

(56) References Cited

U.S. PATENT DOCUMENTS

| | | | | |
|---|---|---|---|---|
| 2023/0252044 A1* | 8/2023 | Klein | .................... | G06N 20/00 707/634 |
| 2023/0252080 A1* | 8/2023 | Klein | .................... | G06N 5/025 707/798 |
| 2023/0273943 A1* | 8/2023 | Baughman | ............. | G06N 5/022 704/9 |

* cited by examiner

SYNCHRONIZATION OF DATA ACROSS DIFFERENT ONTOLOGIES

CROSS REFERENCE TO RELATED APPLICATIONS

This application claims the benefit under 35 U.S.C. § 119(e) of U.S. Provisional Application Ser. No. 63/252,126 filed Oct. 4, 2021, the content of which is incorporated by reference in its entirety into the present disclosure.

FIELD OF THE INVENTION

This disclosure relates to approaches of exporting and writing data while synchronizing or reconciling between different ontologies of systems, platforms, microservices, services, or products (hereinafter "systems").

BACKGROUND

Data creation and consumption has been skyrocketing. In particular, annual data creation increased from 1.2 zettabytes (trillion gigabytes) to an estimated 60 zettabytes from 2010 to 2020. Data is expected to proliferate at ever increasing rates due in part to the rise of remote work and online or mobile applications. Hand in hand with data proliferation, a number of data systems, which include databases and tools, has also soared. Because these systems often have different ontologies, synchronizing data between each of these systems, which includes writing data into, and writing data back from, the systems, has been challenging. Currently, efforts to exchange data between different systems fail to reconcile distinct ontologies of the systems in order to write data into the different systems. Additionally, such systems are primarily implemented as one-way data transfers, in which data is transmitted from a source to a destination. However, such a transmission typically fails to automatically write data into an ontology of the destination. Additionally, data is generally not written back from the destination to the source.

SUMMARY

Various embodiments of the present disclosure can include computing systems, methods, and non-transitory computer readable media configured to write data, bidirectionally, between two systems while reconciling between ontologies of the systems. For example, a first computing system, or a source system may include constructs and/or logic which reconciles between a first ontology of the first computing system and a second ontology of a second computing system to synchronize data updates between the first computing system and the second computing system. The first ontology may have first ontological parameters or characteristics (hereinafter "ontological parameters"). The constructs and/or logic may further detect or receive second ontological parameters as part of the second ontology of the second computing system, and transmit data, or a first update to the data, to the second computing system while incorporating the data into the second ontology of the second computing system. The constructs and/or logic may receive data from the second computing system, and incorporate the data into the first ontology of the first computing system. The constructs and/or logic may further detect changes or edits in the second computing system to be incorporated into the ontology of the first computing system, for example, during a conflict resolution process. Therefore, the constructs and/or logic may synchronize data between two different computing systems while incorporating the data within respective ontologies of the different computing systems in a process of writing data to different computing systems. Previous implementations of data transmission between different systems, in contrast, largely fail to incorporate data within respective ontologies of different systems.

In some embodiments, a first computing system includes one or more processors, a first database, and memory storing instructions that, when executed by the one or more processors, cause the system to perform steps of synchronizing the data with the second computing system. The steps may include receiving an indication of an origination of data within the first database of the first computing system; generating a data object that comprises attributes of the originated data; incorporating a first instance of the data object into a first ontology of the first database; transmitting a second instance of the data object to the second computing system, the transmission comprising incorporating the second instance of the data object into a second ontology of a second database within the second computing system; detecting an update to the second instance of the data object from the second computing system; generating an updated ontological representation of the updated second instance, or receiving the updated ontological representation from the second computing system; and incorporating the updated ontological representation into the first ontology.

In some embodiments, the incorporation of the first instance of the data object into the first ontology of the first database comprises determining a class satisfied by conditions indicated by the attributes based on an inheritance hierarchy of the first database and incorporating the first instance of the data object into the class.

In some embodiments, the incorporation of the second instance of the data object into the second ontology of the second database comprises: generating a timestamp indicating a time at which the second instance was incorporated into the second ontology; and generating an index corresponding to the timestamp, wherein the timestamp and the index are updated in response to the second instance being updated.

In some embodiments, the incorporation of the second instance of the data object into the second ontology of the second database comprises: generating a timestamp indicating a time at which the second instance was incorporated into the second ontology; and generating an index corresponding to the timestamp, wherein the timestamp is updated in response to the second instance being updated.

In some embodiments, the detecting of the update to the second instance is in response to the timestamp being changed.

In some embodiments, the incorporation of the second instance of the data object into the second ontology of the second database comprises: determining, based on a second inheritance hierarchy of the second ontology or based on differences between the first ontology and the second ontology, a second class within the second ontology satisfied by the conditions indicated by the attributes; and incorporating the second instance of the data object into the second class.

In some embodiments, the updated ontological representation comprises a mapping of updated attributes to the second instance of the data object.

In some embodiments, the incorporation of the updated ontological representation comprises: determining whether the class is still satisfied by updated conditions indicated by the updated attributes; and in response to determining that the class is no longer satisfied by the updated conditions:

determining an updated class that is satisfied by the updated conditions; and incorporating an instance of the updated data object into the updated class.

In some embodiments, the incorporation of the updated ontological representation comprises: deleting the first instance of the data object within the class in response to determining that the class is no longer satisfied by the updated conditions.

In some embodiments, the instructions further cause the system to perform a downstream action on the second instance of the data object, the downstream action comprising one of processing, analysis, and monitoring of an entity associated with the data object.

In some embodiments, the reception of the indication that the data within the first computing system has been updated is in response to a performance of a computing task by the first computing system.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 1B may be applicable when an external computing system has written data into a database, and the first computing system is synchronizing data from the external computing system to the first computing system.

FIG. 2A emphasizes the incorporation of the data object into a first database of a first computing system.

FIG. 2B emphasizes the incorporation of the data object into a first database of a first computing system.

FIG. 3A emphasizes the synchronization of the data object to a second database.

DETAILED DESCRIPTION

Figure 1A:
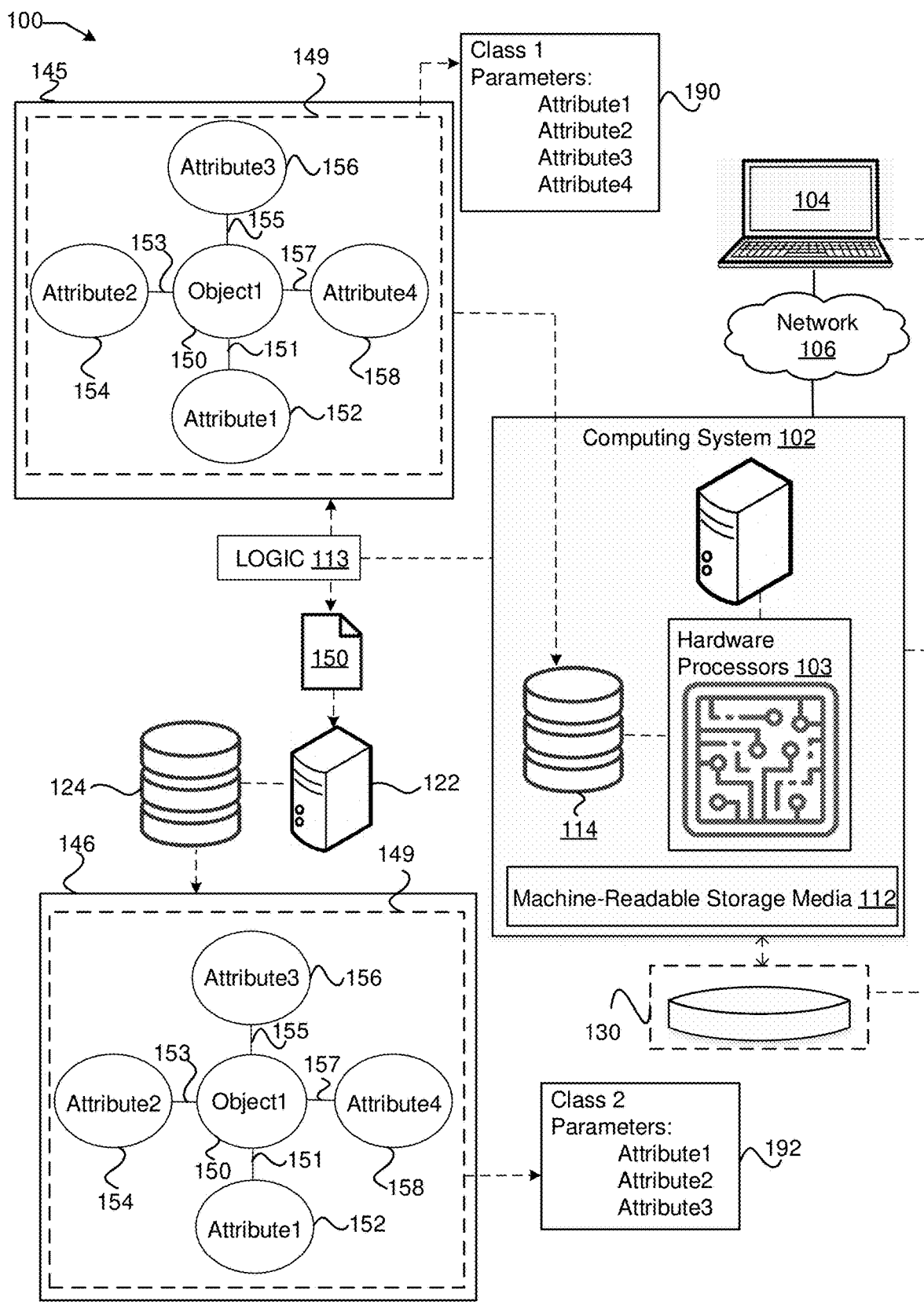
FIG. 1A illustrates an example environment of a first computing system that implements or executes writing of data into a first ontology of a first database within the first computing system while writing the data into a second ontology of a second database within a second computing system, in accordance with various embodiments.

Conventional approaches of transmitting data between different data systems, which may have different ontologies, may fail to incorporate the data into respective ontologies of the different systems. An ontology may describe primitives, such as entities, which may be represented as objects, properties or attributes of the entities, which may incorporate constraints, and relationships or links between the entities. An ontology may be manifested as a specific organization, arrangement, categorization, or classification scheme such as a database, enterprise resource planning (ERP) system, or a schema definition corresponding to entities, properties, and relationships. Databases may include a SQL, NoSQL, relational, non-relational, document, or graph database. Meanwhile, a schema definition may map particular tables, columns and/or rows of a table to particular entities and/or attributes.

Furthermore, such approaches may also fall short in writing data back to a source system that previously or initially transmitted data, or performing further downstream actions or tasks following a previous transmission of data. Therefore, a shortcoming is that data systems currently fail to synchronize data among one another. Here, a system may encompass constructs and/or associated software, hardware, and/or firmware which perform computing tasks related to data, such as reception, storage, analysis, transformation, manipulation, presentation, and/or transmission. A system may include, or be implemented as, one or more platforms, microservices, services, or products. In some embodiments, the constructs may be implemented as part of, or embedded into, logic of the first computing system. The constructs may be embodied in, as nonlimiting examples, application programming interfaces (APIs) such as Representational State Transfer (REST) APIs, webhooks, and/or plugins. The constructs may, in some embodiments, be compatible or consistent with authorization frameworks or protocols such as an Open Authorization (OAuth) or OAuth 2.0 framework.

To address such shortcomings, a new approach includes, defining or implementing one or more constructs at a first computing system, or a source system, to write first data, such as first data objects, and/or first data updates, to a second computing system. The first computing system may include a first database that has a first ontology or first ontological parameters. The second computing system may include a second database that has a second ontology or second ontological parameters. The writing of the first data and/or first data updates (hereinafter "first data") to a second computing system may include ingesting the first data into the second ontology of the second database of the second computing system. In some embodiments, if the first data is not already stored or ingested into the first ontology of the first database, the first data may also be ingested into the first ontology of the first database, sometimes simultaneously or concurrently with the first data being ingested into the second ontology of the second database. In some embodiments, the second ontology of the second database of the second computing system and/or the first ontology of the first database of the first computing system may include definitions of classes, objects within the classes, attributes of the objects, and/or permissible actions on the objects, such as writing a new object, modifying an existing object, and/or further downstream actions.

The ingesting or incorporation (hereinafter "incorporation") of the first data may further entail determining the second ontology or second ontological parameters or characteristics (hereinafter "parameters") of the second database of the second computing system, or receiving an indication of the second ontology or the second ontological parameters. Once the second ontology or the second ontological parameters are known, logic of the first computing system may determine whether the first data is already in an object format, and whether the first data is consistent or compatible with the second ontology or the second ontological parameters of the second database of the second computing system. If the first data is in a non-object format, or is otherwise incompatible with the second ontology or the second ontological parameters of the second computing system, the logic may map or convert the first data into a first object consistent or compatible with the second ontology or the second ontological parameters. For example, if the database of the second computing system defines a class "person" as requiring attributes including a place of residence, an age, and/or an employment status, the logic of the first computing system may convert the first data to, or ensure that the data is in, a format that includes a place or residence, an age, and/or an employment status of the person. If the first data is missing such attributes, then the logic of the first computing system may extract such attributes or prompt a user to fill in the attributes. In other embodiments, the logic of the first computing system may determine a different class within the second database to ingest the first data into.

In some embodiments, the logic may map or relate the first data to the second ontology or the second ontological parameters of the second database by evaluating differences between the first ontology and the second ontology. For example, if the first data includes a first object within a class "human" defined in the first ontology, the logic may determine whether a class "human" also exists within the second ontology and whether the first object is appropriately incorporated into the class "human" of the second ontology depending on a comparison or evaluation of the attributes of the first object with or against the definition of the class "human" within the second ontology. If the logic determines that the class "human" does not exist within the second ontology, the logic may then determine an equivalent or a corresponding class into which the first object may be ingested, such as "person," by comparing or evaluating the attributes of the first object, and/or the definition of the class "human," with or against the definition of the class "person" within the second ontology.

Additionally or alternatively, the logic of the first computing system may determine which class within the second database of the second computing system to ingest the data into. In some embodiments, the logic may evaluate an inheritance hierarchy of the second ontology. As an example, if the second database of the second computing system includes a class "person" and subclasses "children," "teenager," and "adult," the subclasses inherit from the class "person" and further define the class "person" based on an age attribute. The logic may determine that, if the first data includes an age of the person, to ingest the first data not only into the class "person," but additionally or alternatively, to ingest the first data into one of the appropriate subclasses. In some embodiments, if the inheritance hierarchy supports multiple inheritance, the logic may further determine an appropriate class or classes to which the first data is ingested by evaluating the first data against the requirements of the multiple classes inherited from within the second ontology.

In some embodiments, once the first data is ingested into the second ontology of the second database, the logic of the first computing system may index a location at which the first data is ingested, such as a memory location, and continuously track updates to the first data at the indexed location. The logic may register or generate a timestamp corresponding to the time of the first data being ingested. By indexing the location, the logic may obtain an update or indication whenever the first data is updated within the second database, and further obtain a timestamp of the update. If the timestamp of the update exceeds, or is subsequent to the timestamp corresponding to the time of the first data being ingested, the logic may determine that the first data has been updated and may write the update to the first data to the first computing systems that updates to the first data are synchronized between the first database and the second database. The synchronization may also encompass, in addition to updating a local copy of the first data at the first database or the second database, updating the first ontology of the first database or updating the second ontology of the second database.

In some embodiments, an additional consideration of synchronizing the updates to the first data may depend on whether the first database or the second database, or some other database, is the source of truth regarding the first data, assuming a single source of truth. If the first database is the source of truth, any updates or changes to the first data originating at the first database may be synchronized or replicated (hereinafter "replicated," although "synchronized" may have a similar or same meaning) at the second database, as derived from the updates originating at the first database, but any updates to the first data originating at the second database may not be replicated at the first database. Thus, the logic may determine to refrain from replicating or copying updates to the first data from the second database to the first database if the second database is not a source of truth. However, if the second database is the source of truth, any updates or changes to the first data originating at the second database may be replicated to the first database but any changes to the first data originating at the first database may not be replicated to the second database. If some other database has been established as a source of truth, then any updates originating at the first database or the second database would not be replicated at other databases. If both the first database and the second database are established as sources of truth, then any changes of the first data originating at the first database or at the second database would be copied over to or replicated at other databases.

The logic may also receive second data and/or second updates to the second data (hereinafter "second data"), from the second computing system, and incorporate the second data into the first database of the first computing system. The logic may map, resolve, or relate attributes of the second data with the first ontology of the first computing system, in a same or similar manner as described above regarding the mapping of the first data to the second ontology of the second computing system. The mapping may entail comparing a first inheritance hierarchy of the first ontology with, or evaluating the first inheritance against, a second inheritance hierarchy of the second ontology. This evaluation may include determining differences between which classes and subclasses exist within, or are missing from, the first ontology and the second ontology, and relationships between definitions of the classes and subclasses. As a non-limiting example, assume that a second data object of the second database is mapped to, or exists within, a class "person," and no further subclasses are defined within the second ontology. In contrast, the first database may include a class "person" and subclasses "children," "teenager," and "adult," defined based on an age attribute of the person and which inherit from the class "person." If the second data object includes or indicates an age attribute of the person, then the logic may determine that the data object is to be ingested into one of the appropriate subclasses. In such a manner, the logic may reconcile or synchronize between differences in the first ontology of the first database and the second ontology of the second database.

In some embodiments, once the second data is ingested into the first ontology of the first database, the logic may index a location at the second database from which the first data is ingested, such as a memory location, so that updates or changes to the second data originating at the second database may be replicated at the first database. In some embodiments, an additional consideration of synchronizing the updates to the second data may depend on whether the first database or the second database, or some other database, is a source of truth regarding the second data. If the second database has been established as a source of truth, then any updates to the second data originating at the second database are replicated to the first database. If the second database is not a source of truth, then any updates to the second data originating at the second database are not replicated to the first database, in a same or similar manner as described above regarding replicating updates to the first data. These principles will be elucidated in more detail in the subsequent FIGURES.

FIG. 1A illustrates an example environment 100, in accordance with various embodiments, of a computing system 102, such as a first computing system as described previously, that implements or executes writing of data, such as a data object 150, into a first ontology 145 of a first database 114 while writing the data object 150 into a second ontology 146 of a second database 124 within a second computing system 122. In some embodiments, the computing system 102 and/or the second computing system 122 may include physical or cloud computing resources or servers. In a particular example, the second computing system 122 may include an Enterprise Resource Planning (ERP) system. In some embodiments, the writing of the data object 150 into the first ontology 145 and the second ontology 146 may be concurrent or substantially simultaneous. Although the description focuses on data objects, the first ontology and the second ontology 146 may also be compatible with non-object data formats or representations. Thus, non-object data formats may also be represented in the first ontology 145 and the second ontology 146.

The example environment 100 can include at least the computing system 102 and at least one computing device 104. The computing system 102 and the computing device 104 can each include one or more processors and memory. The processors can be configured to perform various operations by interpreting machine-readable instructions, for example, from a machine-readable storage media 112, which may store the instructions to be transmitted to, interpreted by, and executed by the logic 113. The processors can include one or more hardware processors 103 of the computing system 102 that include logic 113 which can be configured to implement or execute the writing of data to different databases and ingesting data objects representing the data into respective ontologies of the different databases, so that different databases are synchronized regarding data updates.

In general, an entity or a user operating the computing device 104 can interact with the computing system 102 over a network 106, for example, through one or more graphical user interfaces and/or application programming interfaces. In some embodiments, the computing device 104, or a user operating the computing device 104, may provide input or feedback regarding the first ontology 145 and/or the second ontology 146. For example, the computing device 104 may provide an input indicating ontological parameters of the second ontology 146, which may include classes, class definitions, existing instances of objects within the classes, and/or inheritance hierarchies of the second ontology 146.

The environment 100 may also include one or more data stores 130 accessible to the computing system 102. The data stores 130 may be accessible to the computing system 102 either directly or over the network 106. In some embodiments, the data stores 130 may store data that may be accessed by the logic 113 to provide the various features described herein. For example, the data stores 130 may store instructions of, or within, various constructs embodied in plugins, APIs, or webhooks, that are incorporated within the logic 113. In some instances, the data stores 130 may include federated data stores, databases, or any other type of data source from which data may be stored and retrieved, for example.

As shown in FIG. 1A, the logic 113 may receive an indication or instruction that the data object 150 is to be ingested into the first database 114 and propagated into a second database 124 of the second computing system 122. In some embodiments, the indication or instruction may be received from the computing device 104 or from an external computing system such as the second computing system 122. In some embodiments, the ingestion of the data object 150 into the first database 114 and propagated into the second database 124 of the second computing system 122 may be automatically triggered at particular time intervals, or in response to a creation of a new data object either within the first database 114 or the second database 124, or an update to an existing data object. The data object 150 may be represented by an ontological representation 149 to include attributes 152, 154, 156, and 158, and respective links 151, 153, 155, and 157 corresponding to the attributes 152, 154, 156, and 158. The links 151, 153, 155, and 157 indicate an existence and a nature of a relationship between the data object 150 and the attributes 152, 154, 156, and 158. The logic 113 may convert or map the ontological representation 149 to ontological parameters of the first ontology 145. For example, the mapping may include, determining one or more classes 190 within the first ontology 145 that include parameters or attributes that are satisfied by, or matched by, conditions indicated by the attributes 152, 154, 156, and 158. Once such a class is determined, the logic 113 may determine parent classes or superclasses from which the class 190 inherits, and/or other subclasses that inherit from the class 190, that also are satisfied by conditions indicated by the attributes 152, 154, 156, and 158. The logic 113 may write or record the data object 150 including the attributes 152, 154, 156, and 158 as an instance within the first ontology 145. In particular, the logic 113 may write the data object 150 within the class 190, parent classes from which the class 190 inherits, and/or other subclasses that inherit from the class 190, that also are satisfied by conditions indicated by the attributes 152, 154, 156, and 158. The writing of the data object 150 may include determining a schema or an organization of data objects within the first database 114 and writing the data object 150, along with the attributes 152, 154, 156, and 158, according to the schema within the first database 114. For example, the schema may include particular tables, columns and rows, and indicate which columns or rows correspond to which of the attributes 152, 154, 156, and 158.

In a same or similar manner, the logic 113 may convert or map the ontological representation 149 to ontological parameters of the second ontology 146. For example, the logic 113 may determine one or more classes 192 within the second ontology 146 that include parameters or attributes that are satisfied by conditions indicated by the attributes 152, 154, 156, and 158, and parent classes from which the class 192 inherits, and/or other subclasses that inherit from the class 192, that also are satisfied by the conditions indicated by the attributes 152, 154, 156, and 158. The logic 113 may write or record the data object 150 including the attributes 152, 154, 156, and 158 as an instance within the second ontology 146. In particular, the logic 113 may write the data object 150 within the class 192, parent classes from which the class 192 inherits, and/or other subclasses that inherit from the class 192, that also are satisfied by the conditions indicated by the attributes 152, 154, 156, and 158. The writing of the data object 150 may include determining a schema or an organization of data objects within the second database 124 and writing the data object 150, along with the attributes 152, 154, 156, and 158, according to the schema within the second database 124. In some embodiments, if no class within the second ontology 146 is sufficiently similar to the class 190, or if no class within the second ontology 146 has a threshold similarity to the class 190, the logic 113 may write the data object 150 into a class within the second ontology 146 that has less specific definitions or requirements compared to the class 190. In other embodiments, the logic 113 may instruct or suggest the second computing system 122 to create a new class consistent with the class 190 and the inheritance hierarchy associated with the class 190.

As will be described in FIG. 5, subsequent to the writing of the data object 150 to the first ontology 145 and the second ontology 146, the logic 113 may perform or implement further downstream actions such as data processing, analysis, monitoring, and/or alerting associated with the data object 150 or an entity associated with the data object 150. The logic 113 may detect further changes made to respective copies of the data object 150 from either the first database 114 or the second database 124, and synchronize the changes to the second database 124 and the first database 114.

Figure 1B:
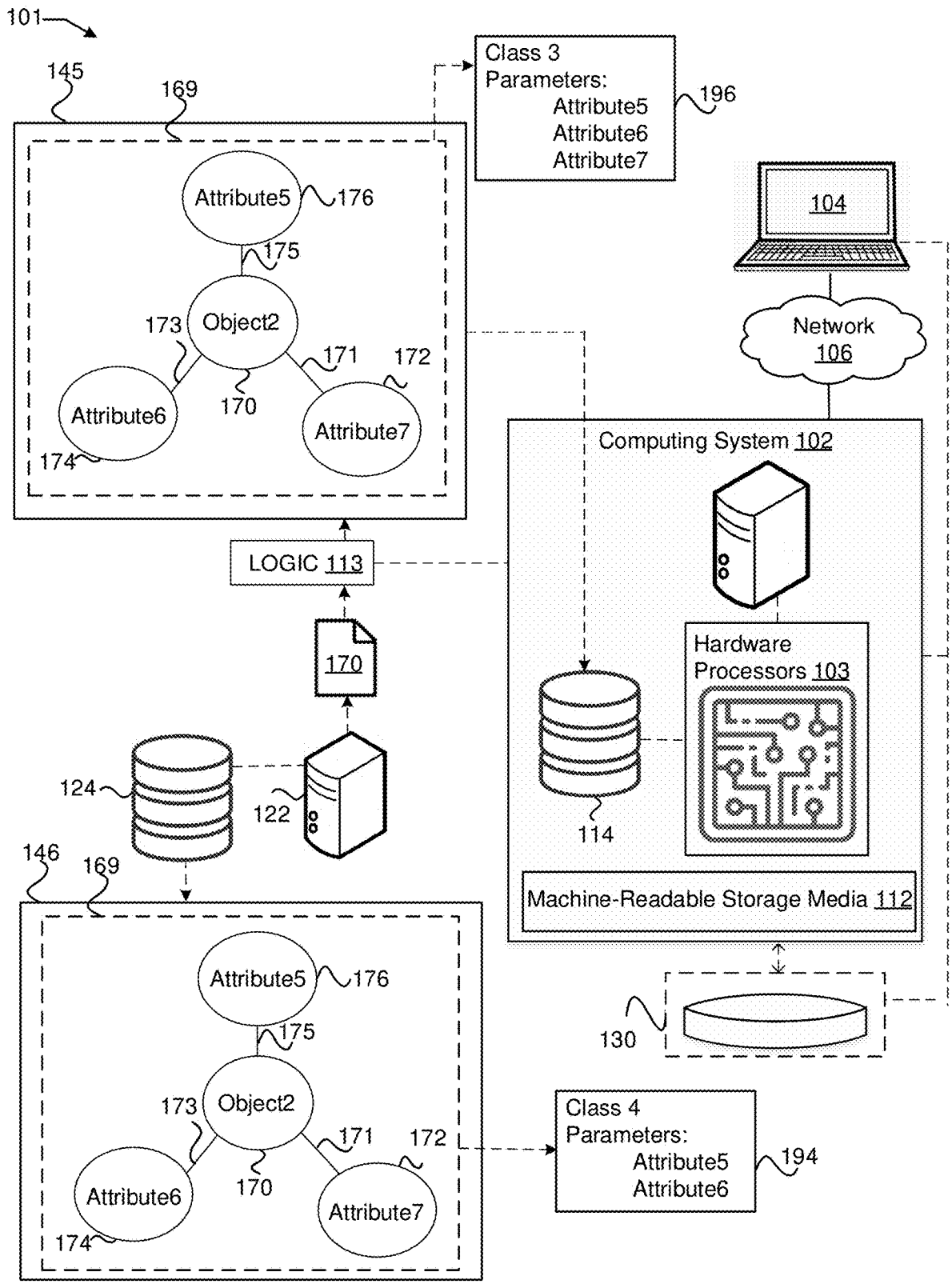
FIG. 1B illustrates an example environment of a first computing system that implements or executes writing of data into a first ontology of a first database within the first computing system, in accordance with various embodiments.

FIG. 1B illustrates an example environment 101, in accordance with various embodiments, of the first computing system 102, that implements or executes writing of data, such as a data object 170, into the first ontology 145 of the first database 114. Relevant principles of FIG. 1A may also apply to FIG. 1B. In FIG. 1B, the data object 170 may have originated at the second database 124. Thus, the logic 113 may receive an indication, such as via a user or the computing device 104, or detect, that a new data object or an update to an existing data object has occurred at an external computing system such as the second computing system 122. The logic 113 may then synchronize the updates of the new data object or the existing data object into the first ontology 145, so that updates at the second ontology 146 of the second database 124 are propagated to the first ontology 145 of the first database 114, and data statuses of the first database 114 and the second database 124 are synchronized across their respective ontologies 145 and 146.

The data object 170 may be represented by an ontological representation 169 to include attributes 172, 174, 176, and 178, and respective links 171, 173, 175, and 177 corresponding to the attributes 172, 174, 176, and 178. The links 171, 173, 175, and 177 indicate an existence and a nature of a relationship between the data object 170 and the attributes 172, 174, 176, and 178. The logic 113 may detect or determine a particular location, such as a memory location, at which an instance of the data object 170 has been incorporated or ingested. For example, the logic 113 may determine that the instance of the data object 170 has been incorporated into a class 194. The logic 113 may determine the ontological representation 169 of the data object 170 from the class 194, and convert or map the ontological representation 169 to ontological parameters of the first ontology 145. For example, the mapping may include, determining one or more classes 196 within the first ontology 145 that include parameters or attributes that are satisfied by conditions indicated by the attributes 172, 174, 176, and 178. Once such a class is determined, the logic 113 may determine parent classes from which the class 196 inherits, and/or other subclasses that inherit from the class 196, that are satisfied by the conditions indicated by the attributes 172, 174, 176, and 178. The logic 113 may write or record the data object 170 including the attributes 172, 174, 176, and 178 as an instance within the first ontology 145. In particular, the logic 113 may write the data object 170 within the class 196, parent classes from which the class 196 inherits, and/or other subclasses that inherit from the class 196, that also are satisfied by the conditions indicated by the attributes 172, 174, 176, and 178. The writing of the data object 170 may include determining a schema or an organization of data objects within the first database 114 and writing the data object 170, along with the attributes 172, 174, 176, and 178, according to the schema within the first database 114. Here, classes may be defined differently between the second ontology 146 and the first ontology 145. In particular, the class 194 of the second ontology 146 requires parameters indicated by the attributes 174 and 176, but does not require a parameter indicated by the attribute 172. Meanwhile, the class 196 of the first ontology 145 requires parameters indicated by the attributes 172, 174, and 176. Thus, the logic 113 cannot simply write the data object 170 to the first ontology 145 in a same manner as the data object 170 was written to the second ontology 146.

The logic 113 may perform or implement further downstream actions such as data processing, analysis, monitoring, and/or alerting associated with the data object 170. The logic 113 may detect further changes made to respective copies of the data object 170 from either the first database 114 or the second database 124, and synchronize the changes to the second database 124 and the first database 114.

Figure 1C:
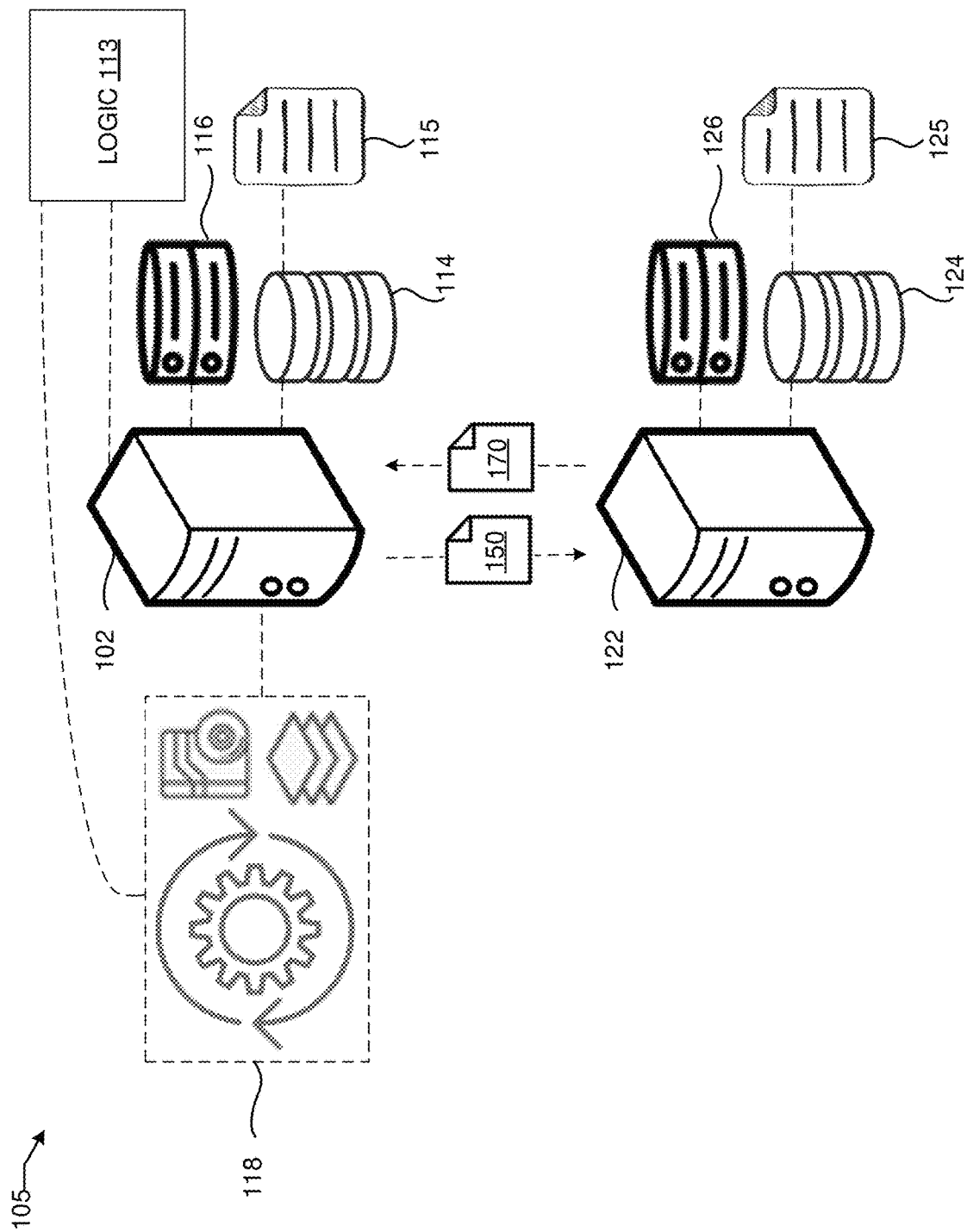
FIG. 1C illustrates an example implementation, in accordance with various embodiments, of a first computing system that implements or executes writing of data into a first database of the first computing system, and to a second database of the second computing system. Principles described in FIGS. 1A and 1B may be applied to FIG. 1C.

FIG. 1C illustrates an example implementation 105, in accordance with various embodiments, of the first computing system 102, that implements or executes writing of data into the first database 114 of the first computing system 102, and to the second database 124 of the second computing system 122. FIG. 1C illustrates certain features of the first computing system 102 and the second computing system 122 in more detail. The implementation 105 may be in conjunction with the embodiments illustrated in FIG. 1A or 1B. In FIG. 1C, a construct 118 may, in some embodiments, be implemented as part of the logic 113. The construct 118 may, as previously alluded to in FIGS. 1A and 1B, be defined, programmed, or configured to reconcile between the first ontology 145 of the first computing system 102 and the second ontology 146 of the second computing system 122 to synchronize data updates, for example, of the data objects 150 and 170, between the first computing system 102 and the second computing system 122. Although the data updates are illustrated as encompassing creation of new data objects 150 and 170, data updates may additionally include updates or modifications to existing data objects or copying or replicating of existing data objects, as additional illustrative examples. The constructs 118 may be embodied in one or more plugins, APIs, and/or webhooks that include instructions to write data updates to one or more external computing systems such as the second computing system 122, in particular, to the second database 124. The constructs 118 may further write the data updates to the first ontology 145 of the first database 114, track statuses of the data objects 150 and 170 at the second database 124, and perform or execute downstream actions, as will be described in FIG. 5.

The first database 114 may further include, or be associated with, a first schema 115. The first schema 115 includes an organization of data objects within the first database 114. For example, the first schema 115 may include particular tables, columns and rows, and indicate which columns or rows correspond to particular attributes of the data objects. As a specific example, the first schema may indicate that a first column corresponds to or indicates a "person" object, a second column corresponds to an "employment status" attribute of the "person" object, and a third column corresponds to a "location" attribute of the "person" object. The first schema 115 further indexes the data objects and/or attributes of the respective data objects, which facilitates searching and/or tracking of the data objects.

The first computing system 102 may further be associated with a first cache 116, which caches a subset of objects stored in the first database 114. For example, the first cache 116 may cache objects on a basis of a frequency of updating and/or a frequency of access. Thus, the first cache 116 may selectively cache data objects that are most frequently updated and/or accessed. The first cache 116 may also be updated in response to updates in the first database 114 upon detection of such updates, or alternatively, be updated at fixed intervals.

In a same or similar implementation to the first database 114, the second database 124 may further include, or be associated with, a second schema 125. The second schema 125 includes an organization of data objects within the second database 124. For example, the second schema 125 may include particular tables, columns and rows, and indicate which columns or rows correspond to particular attributes of data objects. The second schema 125 further indexes the data objects and/or attributes of the respective data objects, which facilitates searching and/or tracking of the data objects.

The second computing system 122 may further be associated with a second cache 126, which caches a subset of objects stored in the second database 124. For example, the second cache 126 may cache objects on a basis of a frequency of updating and/or a frequency of access. Thus, the second cache 126 may selectively cache data objects that are most frequently updated and/or accessed. The second cache 126 may also be updated in response to updates in the second database 124 upon detection of such updates, or alternatively, be updated at fixed intervals.

Figure 2A:
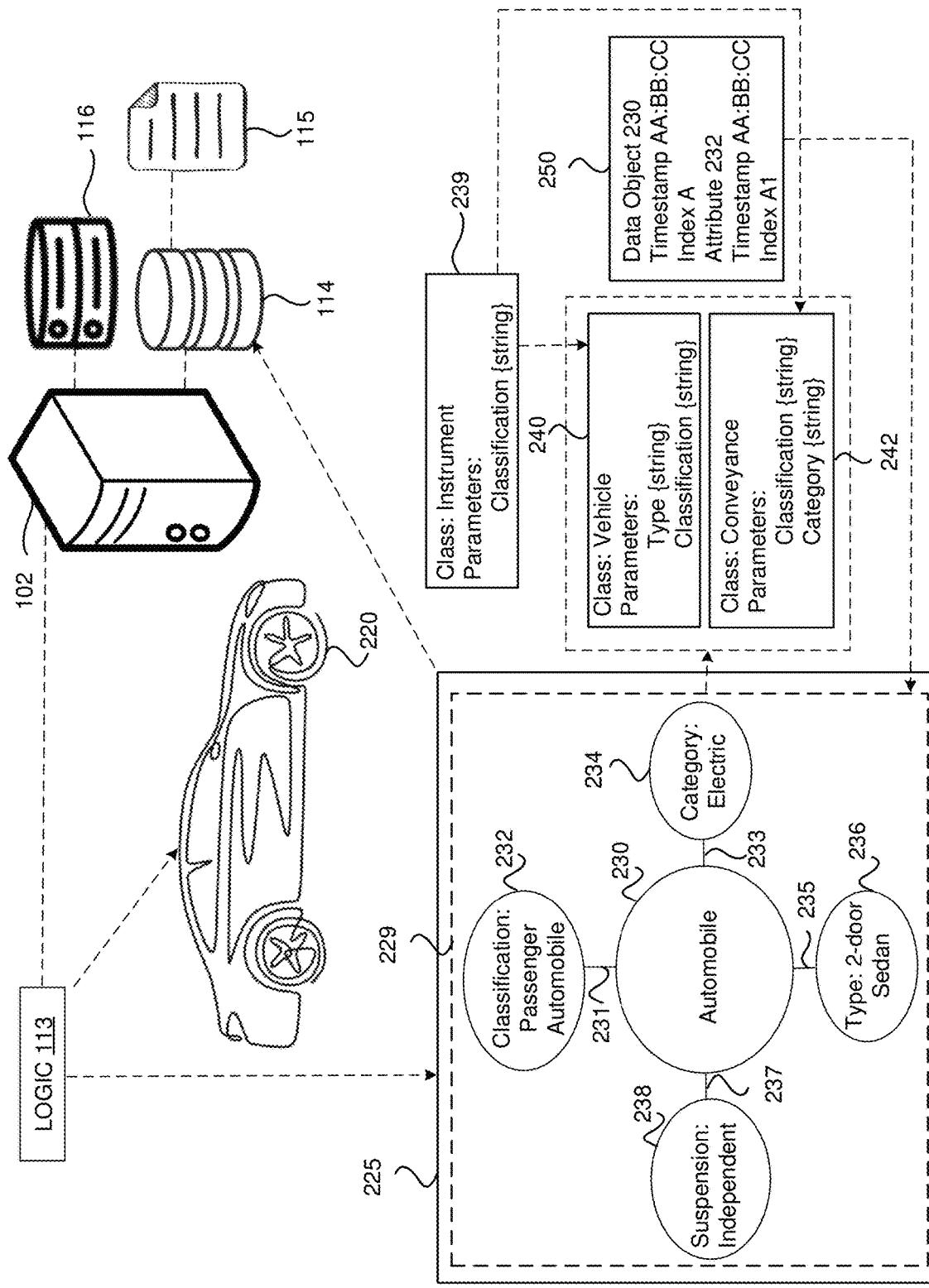
FIG. 2A illustrates an example implementation of a step in synchronizing a data object across different databases that have different ontologies, consistent with FIGS. 1A, 1B, and 1C, in accordance with various embodiments.

FIG. 2A illustrates an example implementation of a step in synchronizing a data object across databases that may have different ontologies, consistent with FIGS. 1A, 1B, and 1C. In FIG. 2A, the logic 113 may perform a task associated with a virtual or physical entity. For sake of illustration, in FIGS. 2A, 2B, 2C, 3A, and 3B, 4A, and 4B, the physical entity is illustrated as an automobile 220. In the following FIGS. 2A, 2B, 2C, 3A, 3B, 4A, 4B, and 5, exemplary automobiles are depicted solely to illustrate the concepts of data objects, which may apply to any physical or virtual entities besides automobiles. For example, the logic 113 may have received an indication that the automobile 220 originated or was newly discovered, for example, within an environment of the first computing system 102. The logic 113 may then generate and/or record a data object, for example, that reflects attributes of the automobile 220. In some examples, even if the automobile 220 originated or was discovered outside an environment of the first computing system 102, the logic 113 may obtain, determine, or extract the attributes of the automobile 220, or receive an indication of such, and generate and/or record a data object that reflects attributes of the automobile 220 in a similar manner. Subsequent steps at the first computing system 102 may be performed in a same or similar manner, whether the automobile 220 originated at the first computing system 102, the second computing system 122, or another external computing system.

In this particular example, the automobile 220 may be stored within the first database 114.

As illustrated in FIG. 2A, the logic 113 may generate or record a data object 230 reflecting or indicating attributes of the automobile 220, within a first ontology 225. The data object 230 may incorporate any known or derived identifications of the automobile 220. The first ontology 225 may be implemented as the first ontology 145 illustrated in FIGS. 1A and 1B. The data object 230 may be represented within an ontological representation 229 to include attributes 232, 234, 236, and 238, and respective links 231, 233, 235, and 237 corresponding to the attributes 232, 234, 236, and 238. The links 231, 233, 235, and 237 indicate an existence and a nature of a relationship between the data object 230 and the attributes 232, 234, 236, and 238. The data object 230 represents properties, characteristics, attributes, and/or parameters of the automobile 220. The data object 230 specifies an identify of the automobile 220. The attribute 232 specifies that a classification of the automobile 220 is a passenger automobile. Meanwhile, the attribute 234 specifies a power source for the automobile 220, that a category of the automobile 220 is electric, meaning that the automobile 220 is gasoline-powered. The attribute 236 specifies that a type of the automobile 220 is a 2-door sedan. The attribute 238 specifies that a suspension of the automobile 220 is independent. The aforementioned attributes 232, 234, 236, and 238 are illustrated only for example; any other pertinent characteristics of the automobile 220 may be applied as attributes.

The logic 113 may convert, map, or correlate the ontological representation 229 to or with ontological parameters or characteristics of the first ontology 225. For example, the mapping may include, determining one or more classes within the first ontology 225 that include parameters or attributes that are satisfied by conditions indicated by the attributes 232, 234, 236, and 238 (e.g., the ontological representation 229). As illustrated in FIG. 2A, classes 240 and 242 are satisfied by conditions indicated by the attributes 232, 234, 236, and 238. The class 240, identified as "vehicle," specifies that a required parameter of the class 240 is a type of a vehicle and a classification of the vehicle. The type and the classification are each to be specified in a string format. Therefore, any objects that lack an attribute indicating a type or a classification o cannot be classified, or belong to, the class 240. However, here, the data object 230 does belong to the class 240 because the data object 230 specifies that the type is a 2-door sedan, as indicated by the attribute 236, and the classification is a passenger automobile, as indicated by the attribute 232, thus satisfying the requirements or constraints of the class 240.

Additionally, the class 242, identified as "conveyance," specifies that required parameters of the class 242 include a classification and a category, each of which are to be specified as a string. Therefore, any objects that lack either an attribute indicating the classification or the category cannot be classified, or belong to, the class 242. However, here, the data object 230 does belong to the class 242 because the data object 230 specifies that the classification is a passenger automobile, as indicated by the attribute 232, and that a category is electric, as indicated by the attribute 234, thus satisfying the requirements of the class 242. Therefore, the logic 113 may incorporate the data object 230 into the classes 240 and 242. The logic 113 may apply same or similar principles to incorporate the data object into any other classes within the first ontology 225 in which required parameters or other constraints are satisfied by the ontological representation 229.

Once the logic 113 determines the classes 240 and 242 as being satisfied by conditions indicated by the attributes 232, 234, 236, and 238, the logic 113 may determine parent classes from which the classes 240 and/or 242 inherit, and/or other subclasses that inherit from the classes 240 and/or 242, that also are satisfied by the conditions indicated by the attributes 232, 234, 236, and 238. One such parent class includes a class 239, identified as "instrument," which requires a classification. The class 242, as well as the class 240, inherit from the class 239, thereby exhibiting multiple inheritance. The principles herein may apply to scenarios of single inheritance as well. In some embodiments, the logic 113 may incorporate the data object 230 into the class 239. In other embodiments, the logic 113 may selectively incorporate the data object 230 into any class that is satisfied by the attributes 232, 234, 236, and 238, such as the classes 240 and 242, given that no subclass that inherits from that class would also be satisfied by the attributes 232, 234, 236, and 238. In other words, the logic 113 may selectively incorporate the data object 230 into classes of highest levels of specificity that still satisfy the attributes 232, 234, 236, and 238, while refraining from incorporating the data object 230 into classes of lower levels of specificity even if those classes are satisfied by the conditions indicated by the attributes 232, 234, 236, and 238. Under such criteria, the data object 230 would not be incorporated into the class 239, but may be incorporated into the classes 240 and 242. Here, incorporation of the data object 230 may be construed as incorporating or ingesting an instance of the data object 230 into proper or appropriate classes.

The incorporation of the data object 230 may include timestamping the data object 230 or the ontological representation 229 of the data object 230 to indicate a time of incorporation and/or indexing the data object 230, and/or the attributes 232, 234, 236, and 238, in order to further track updates of the data object 230, as illustrated by a record 250 incorporated into the classes 240 and 242. Although only a timestamp and an index corresponding to the attribute 232 is shown for simplicity, timestamps and indices corresponding to all of the other attributes 234, 236, and 238 may also be generated and presented. In the record 250, the data object 230 is indexed by A, and the attribute 232 is indexed by A1. The timestamp will be updated every time a modification to the data object 230 is made. Thus, for example, if the attribute 232 is updated, the timestamp corresponding to the attribute 232, and to the data object 230, would be updated but the timestamps corresponding to the attributes 234, 236, and 238 may remain the same. In some embodiments, the index may also be incremented whenever a modification to the data object 230 is made.

Figure 2B:
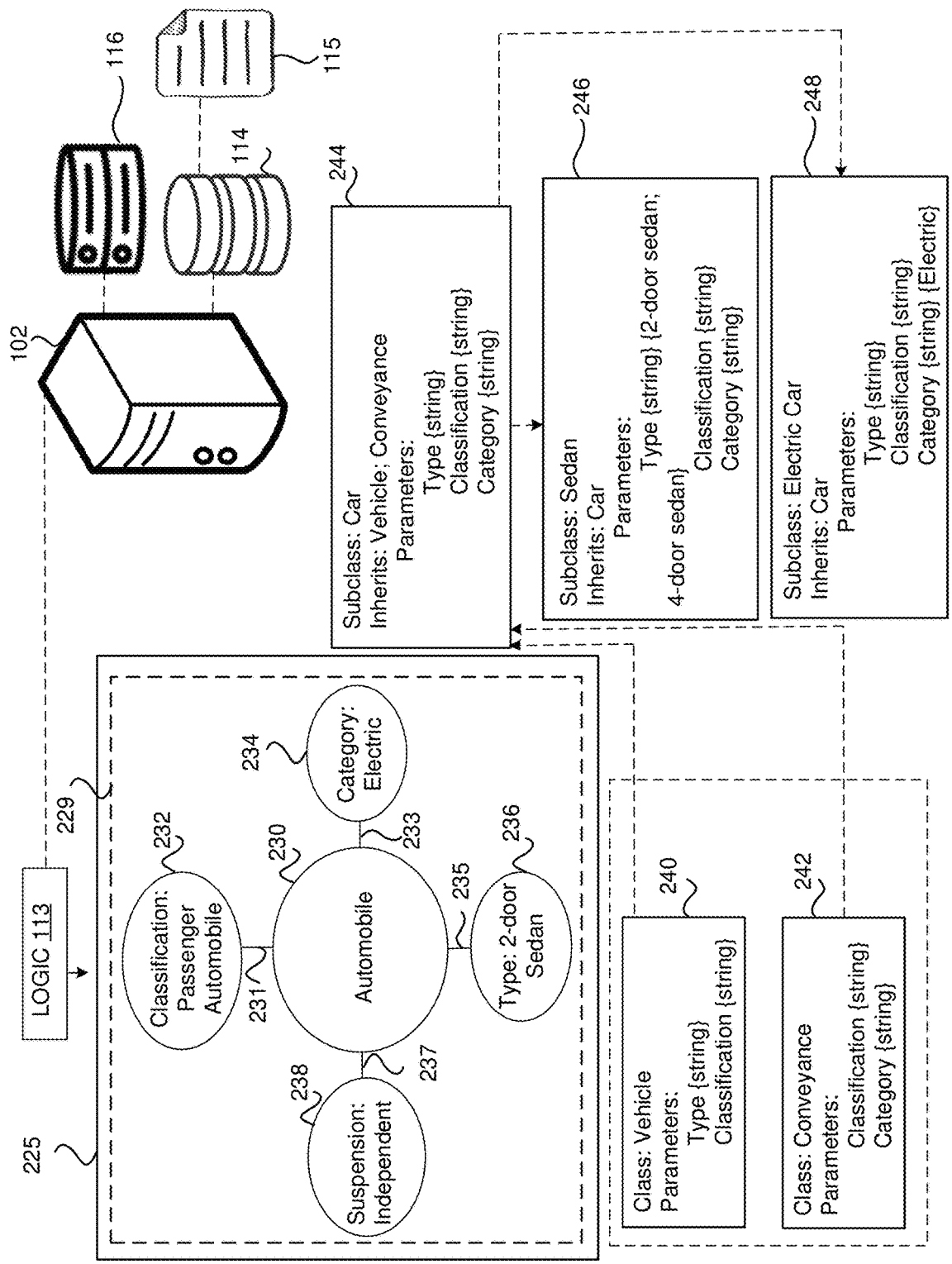
FIG. 2B illustrates an example implementation of a subsequent step in synchronizing a data object across different databases that have different ontologies, consistent with FIGS. 1A, 1B, 1C, and 2A, in accordance with various embodiments.

Next, the determination of subclasses that inherit from the classes 240 and 242 is illustrated in FIG. 2B. FIG. 2B illustrates an example implementation of a subsequent step in incorporating the data object 230 into the first ontology 225, consistent with FIGS. 1A, 1B, 1C, and 2A. The logic 113 may determine that a subclass 244, identified as "car," is also satisfied by the conditions indicated by the attributes 232, 234, 236, and 238. The subclass 244 inherits from both the class 240 and the class 242, because the subclass 244 includes all the requirements of both the classes 240 and 242 and at least some of the requirements in subclass 244 are more specific compared to those in the classes 240 and 242. The subclass 244 requires a type, a classification, and a category, all of which are to be specified as a string format. Because a car is a particular type of a vehicle or conveyance, a car is encompassed within a definition of a vehicle or conveyance. Therefore, the data object 230 having the attributes 236, 232, and 234 indicating the type, classification, and the category of the data object 230, respectively, satisfy the respective requirements of the subclass 244.

The logic 113 may further determine whether any sub-subclasses of the subclass 244 are also satisfied by the conditions indicated by the attributes 232, 234, 236, and 238. The logic 113 may determine that a sub-subclass 246 is satisfied by the conditions because the sub-subclass 246 requires, in addition to the requirements of the subclass 244, that the type classification be either a 2-door sedan or a 4-door sedan. The attribute 236 indicates that the type of the data object 230 is a 2-door sedan, thereby satisfying the requirements of the sub-subclass 246. Thus, the logic 113 may incorporate an instance of the data object 230 into the sub-subclass 246.

The logic 113 may determine that a sub-subclass 248 is satisfied by the conditions because the attributes 232, 234, 236, and 238 comply with all the requirements of the sub-subclass 248. The sub-subclass 248 requires, in addition to the requirements of the sub-class 244, that the category be "electric." The attribute 234 indicates that the category of the data object 230 is electric, thereby satisfying the requirements of the sub-subclass 248. Thus, the logic 113 may incorporate an instance of the data object 230 into the sub-subclass 248. In some embodiments, the logic 113 may also incorporate an instance of the data object 230 into the subclass 244.

Figure 2C:
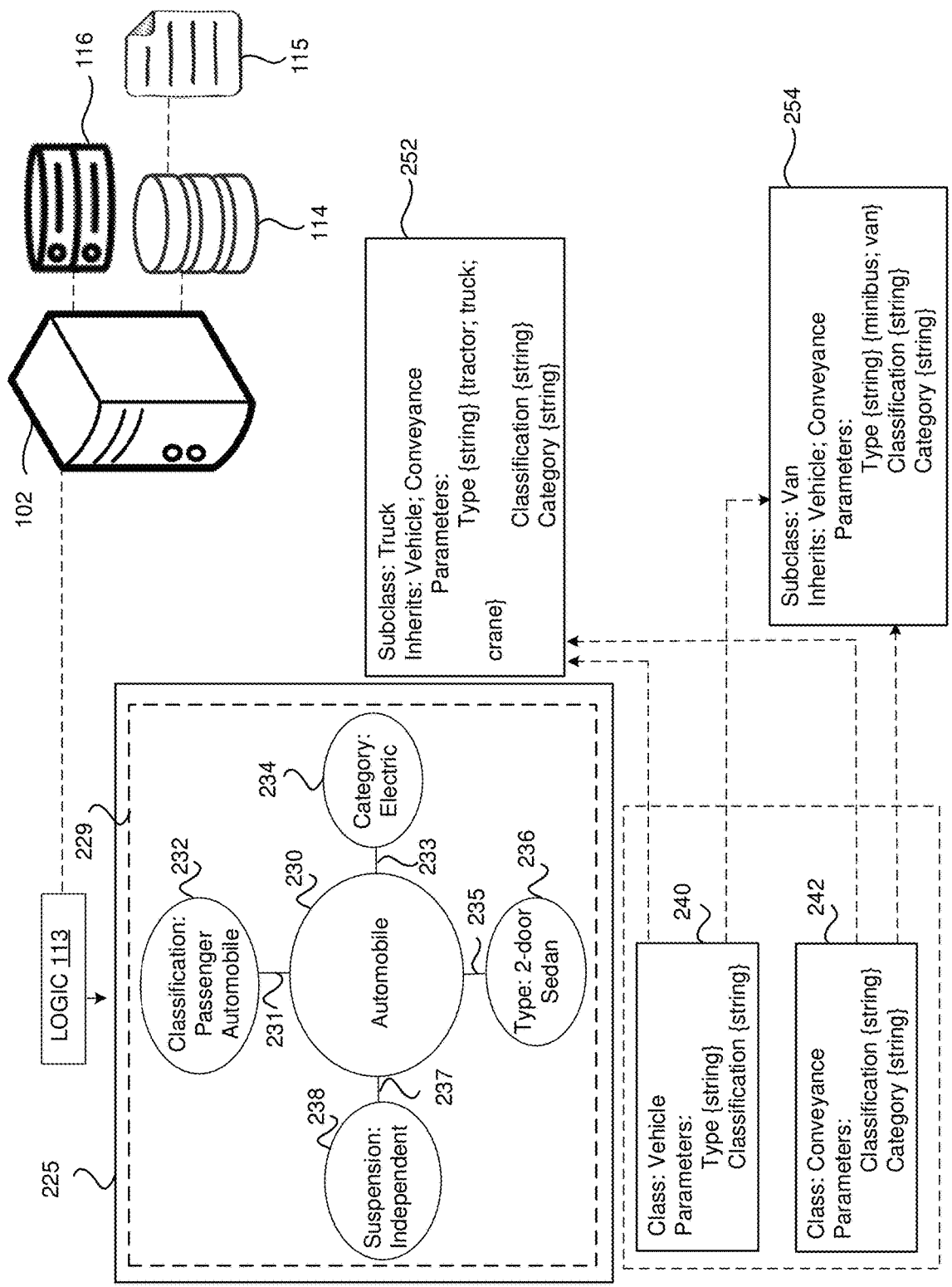
FIG. 2C illustrates an exemplary scenario regarding an incorporation of a data object into a first database of a first computing system, consistent with FIGS. 1A, 1B, 1C, 2A, and 2B, in accordance with various embodiments.

FIG. 2C illustrates a scenario where subclasses 252 and 254 fail to be satisfied by the conditions indicated by the attributes 232, 234, 236, and 238. In particular, the subclass 252 requires that the type be either a tractor, a truck, or a crane. In contrast, the data object 230 has a type of a 2-door sedan, as indicated by the attribute 236, which does not fall under any of the enumerated categories of the type under the subclass 252. Thus, the data object 230 violates the requirements of the subclass 252. Next, the subclass 254 requires that the type be either a minibus or a van. In contrast, the data object 230 has a type of a 2-door sedan, as indicated by the attribute 236, which does not fall under either of the enumerated categories of the type under the subclass 254. Thus, the data object 230 violates the requirements of the subclass 254. Therefore, the logic 113 does not incorporate the data object 230 into any of the subclasses 252 and 254.

Figure 3A:
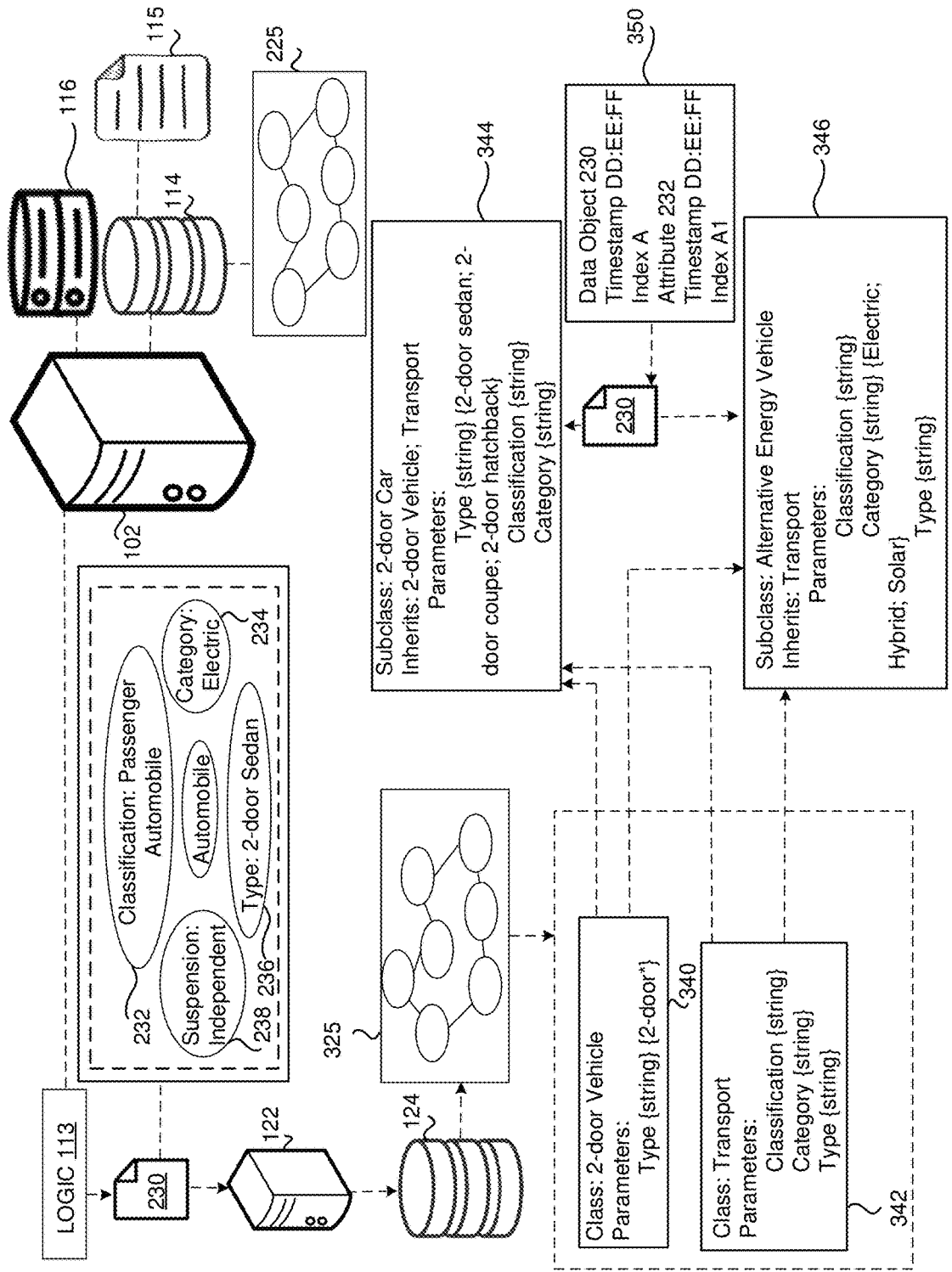
FIG. 3A illustrates an example implementation of a subsequent step in synchronizing a data object across different databases that have different ontologies, consistent with FIGS. 1A, 1B, 1C, 2A, 2B, and 2C.

FIG. 3A illustrates an example implementation of synchronization of a data object across different databases that have different ontologies, consistent with FIGS. 1A, 1B, 1C, 2A, 2B, and 2C. In FIG. 3A, the logic 113 may synchronize the data object 230 into the second ontology 325 of the second database 124 of the second computing system 122. In some examples, the second computing system 122 may include an ERP system. The second ontology 325 may be different from the first ontology 225. In particular, definitions of classes and the inheritance hierarchy of the second ontology 325 may be dissimilar from those of the first ontology 225.

The logic 113 may write or record the data object 230 including the attributes 232, 234, 236, and 238 as an instance within the second ontology 325. If the second ontology 325 is different from the first ontology 225, the writing or recording into the second ontology 325 would follow a similar or same principle, but be a separate process from that described in FIGS. 2A, 2B, and 2C. The logic 113 may further detect any access control requirements or restrictions within the second database 124, and/or at other external databases, and either redact or delete portions of data accordingly. For example, if users at the second database 124 are not permitted to modify or view certain attributes of a data object, the logic 113 may enforce such restrictions by implementing write restrictions on, redacting, or deleting certain attributes.

The logic 113 may convert, map, or correlate the ontological parameters or characteristics of the first ontology 225 to or with ontological parameters or characteristics of the second ontology 325. For example, the mapping may include, determining one or more classes within the second ontology 325 that include parameters or attributes that are satisfied by conditions indicated by the attributes 232, 234, 236, and 238 of the data object 230. These classes within the second ontology 325 may differ, in name and/or required parameters, from classes within the first ontology 225. As illustrated in FIG. 3A, classes 340 and 342 are satisfied by conditions indicated by the attributes 232, 234, 236, and 238. The class 340, identified as "2-door vehicle," specifies that a required parameter of the class 340 is a type, which is to be in a string format, and include the term "2-door" with a subsequent wildcard. Therefore, any data objects that lack an attribute having the required parameter cannot be classified, or belong to, the class 340. However, here, the data object 230 does belong to the class 340 because the data object 230 specifies that the type is a 2-door sedan, as indicated by the attribute 234, thus satisfying the requirements of the class 340.

Additionally, the class 342, identified as a "transport," specifies that required parameters of the class 342 include a classification, a category, and a type, each of which is to be specified as a string. Therefore, any objects that lack either an attribute indicating a classification, a category, or a type cannot be classified, or belong to, the class 342. However, here, the data object 230 does belong to the class 342 because the data object 230 specifies a classification, a category, and a type, as indicated by the attributes 232, 234 and 236, respectively, thus satisfying the requirements of the class 342. Therefore, the logic 113 may incorporate the data object 230 into the classes 340 and 342.

Once the logic 113 determines the classes 340 and 342 as being satisfied by conditions indicated by the attributes 232, 234, 236, and 238 of the data object 230, the logic 113 may determine parent classes from which the classes 340 and/or 342 inherit, and/or other subclasses that inherit from the classes 240 and/or 242, that also are satisfied by the conditions indicated by the attributes 232, 234, 236, and 238. Here, assume for simplicity that no such parent classes exist.

The logic 113 may determine that a subclass 344, identified as "2-door car," is also satisfied by the conditions indicated by the attributes 232, 234, 236, and 238 of the data object 230. The subclass 344 inherits from both the class 340 and the class 342, because the subclass 344 includes all the requirements of both the classes 340 and 342 and at least some of the requirements in subclass 344 are more specific compared to those in the classes 340 and 342. The subclass 344 requires that a type be any of a 2-door sedan, a 2-door coupe, or a 2-door hatchback. Here, the data object 230 has the attribute 236 indicating that the type of the data object 230 is a 2-door sedan, which falls under one of the permitted types of the subclass 344. Therefore, the data object 230 having the attribute 236 satisfies the type requirement of the subclass 344. The other requirements of classification and category within the subclass 344 are the same as those within the class 342, and also satisfied by the data object 230. Similarly, the logic 113 determines that the attributes 232, 234, 236, and 238 of the data object 230 satisfy all requirements of a subclass 346, identified as "Alternative Energy Vehicle," because the attribute 234 of the data object 230 indicates a category of electric, which falls under one of the permitted categories within the subclass 346.

In some embodiments, the logic 113 may incorporate the data object 230 into the classes 340, 342, and the subclasses 344, 346. The incorporation of the data object 230 may include timestamping the data object 230 or the ontological representation 229 of the data object 230 to indicate a time of incorporation and/or indexing the data object 230, and/or the attributes 232, 234, 236, and 238, in order to further track updates of the data object 230, as illustrated by a record 350, which may be implemented in a same or similar manner as the record 250 in FIG. 2A. In other embodiments, the logic 113 may selectively incorporate the data object 230 into any class that is satisfied by the attributes 232, 234, 236, and 238, given that no subclass that inherits from that class would also be satisfied by the attributes 232, 234, 236, and 238. In other words, the logic 113 may selectively incorporate the data object 230 into classes of highest levels of specificity that still satisfy the attributes 232, 234, 236, and 238, while refraining from incorporating the data object 230 into classes of lower levels of specificity even if those classes are satisfied by the conditions indicated by the attributes 232, 234, 236, and 238. Under such criteria, the data object 230 would not be incorporated into the class 340 and 342, and only incorporated within the subclasses 344 and 346, assuming that no sub-subclasses of the subclasses 344 and 346 have requirements that are also satisfied by the conditions indicated by the attributes 232, 234, 236, and 238.

Figure 3B:
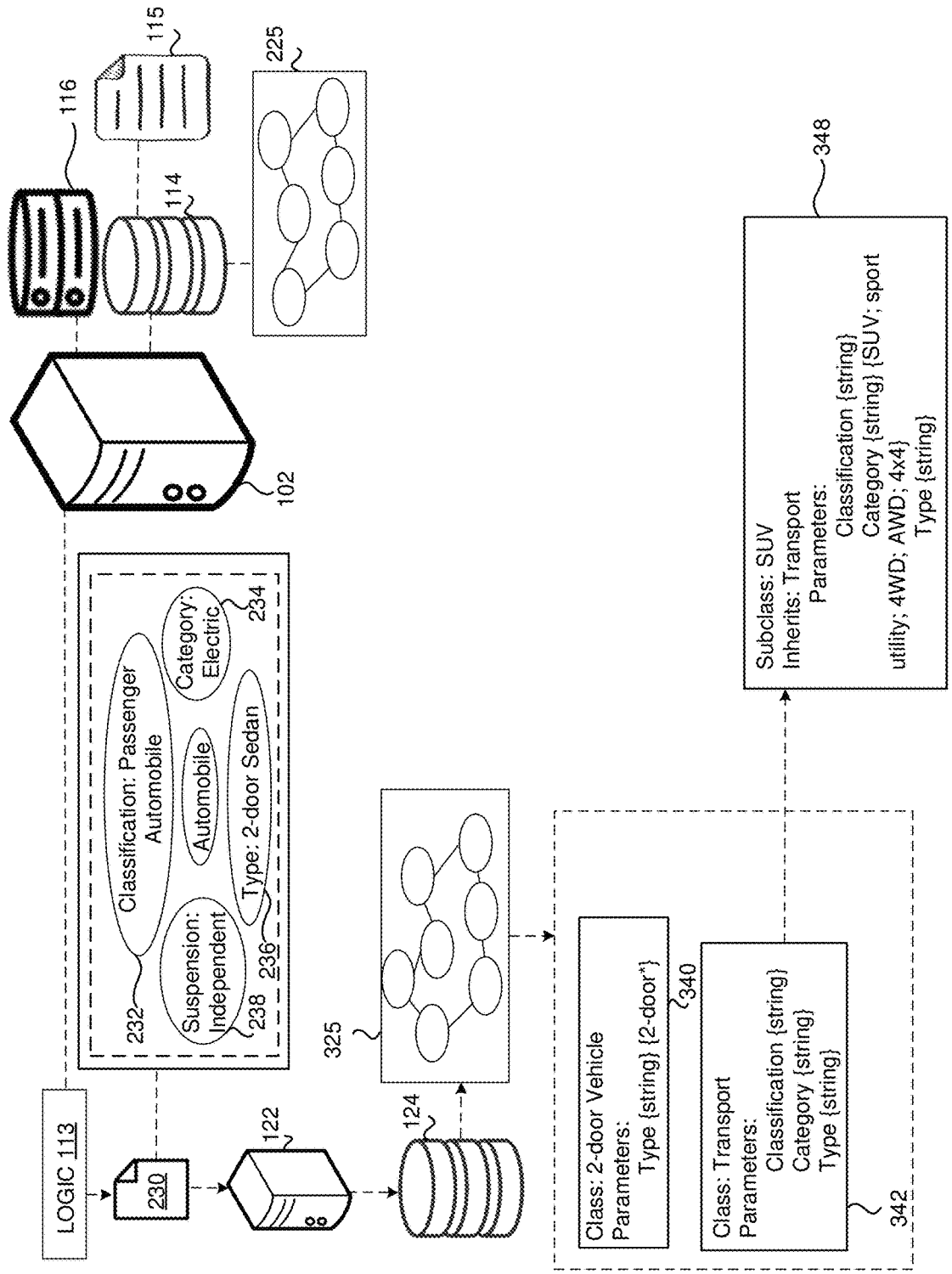
FIG. 3B illustrates an exemplary scenario regarding a synchronization of the data object to a second database, consistent with FIGS. 1A, 1B, 1C, 2A, 2B, 2C, and 3A, in accordance with various embodiments.

FIG. 3B illustrates an implementation of determining that a subclass within the second ontology 325 fails to be satisfied by the conditions indicated by the attributes 232, 234, 236, and 238. In particular, the logic 113 may determine that a subclass 348, identified as "SUV," has a requirement of a category being one of SUV, sport utility, 4WD, AWD, or 4×4. Because none of the attributes 232, 234, 236, or 238 specify such a category, the logic 113 may determine that the category requirement of the subclass 348 fails to be satisfied by the attributes 232, 234, 236, or 238. Therefore, no instance of the data object 230 would be incorporated into the subclass 348.

Figure 4A:
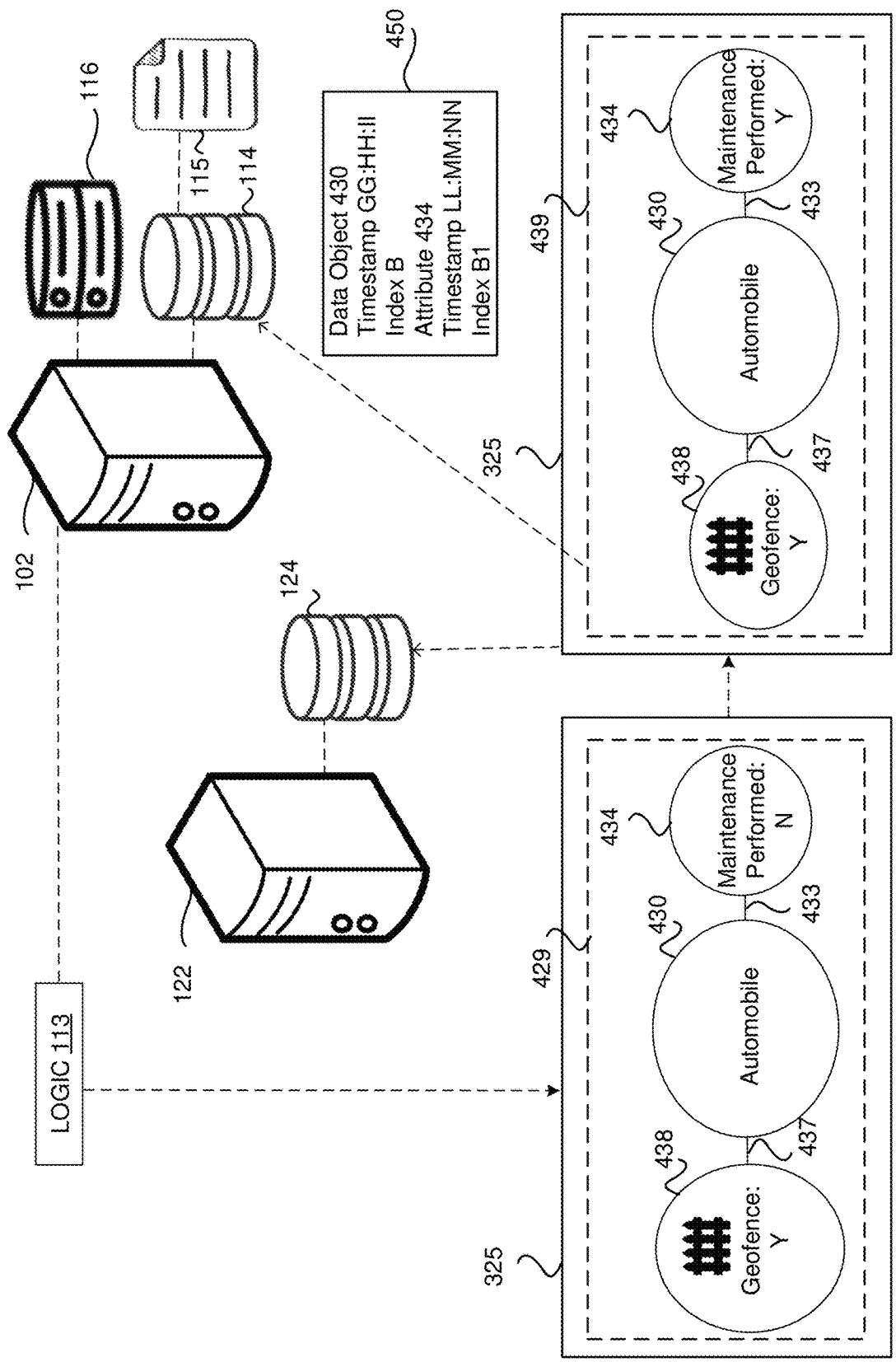
FIG. 4A illustrates an example implementation of a second computing system modifying a data object following incorporation of the data object into the second computing system, consistent with FIGS. 1A, 1B, 1C, 2A, 2B, 2C, 3A, and 3B, in accordance with various embodiments.

FIG. 4A illustrates an implementation of the second computing system 122 modifying a data object 430 following incorporation of the data object 430 into the second ontology 325. The data object 430 may correspond to or represent the automobile 220, or a different automobile. In particular, the modification of the data object 430 may encompass modification of one or more dynamic attributes, which may be updated or changed in status. In particular, the data object 430 includes an automobile identifier, and dynamic attributes 434 and 438, linked to the data object 430 by links 433 and 437. The dynamic attribute 434 indicates whether a maintenance has been performed, for example, within some previous time period. Meanwhile, the dynamic attribute 438 indicates whether a current location of the automobile represented by the data object 430 is within a geofence, and may be obtained by a sensor such as a GPS (Global Positioning System) sensor or other location obtaining sensor. Thus, at least some attributes of the data object 430 may be obtained from external sources outside of the second computing system 122. Initially, the data object 430 may have an ontological representation 429, indicating that no maintenance has been performed within some previous time period and that the automobile is within a particular geofence.

When an attribute changes, for example, the dynamic attribute 434, the ontological representation 429 may be changed to an updated ontological representation 439. As a result, a timestamp of the attribute 434 and the data object 430, and/or an index of the aforementioned, may be updated or incremented to indicate the change in an updated record 450. The logic 113 may detect such a modification to the data object 430 and the particular modification that occurred in the attribute 434. Assuming that the second computing system 122 is a source of truth of the data object 430, and/or that updates at the second computing system 122 are to be replicated, the logic 113 may update the data object 430 within the first database 114 and the first ontology 225 by also incorporating the updated ontological representation 439, in particular, the modification of the attribute 434 into any instances or copies of the data object 430 that exist within the first database 114 and/or the first cache 116.

Figure 4B:
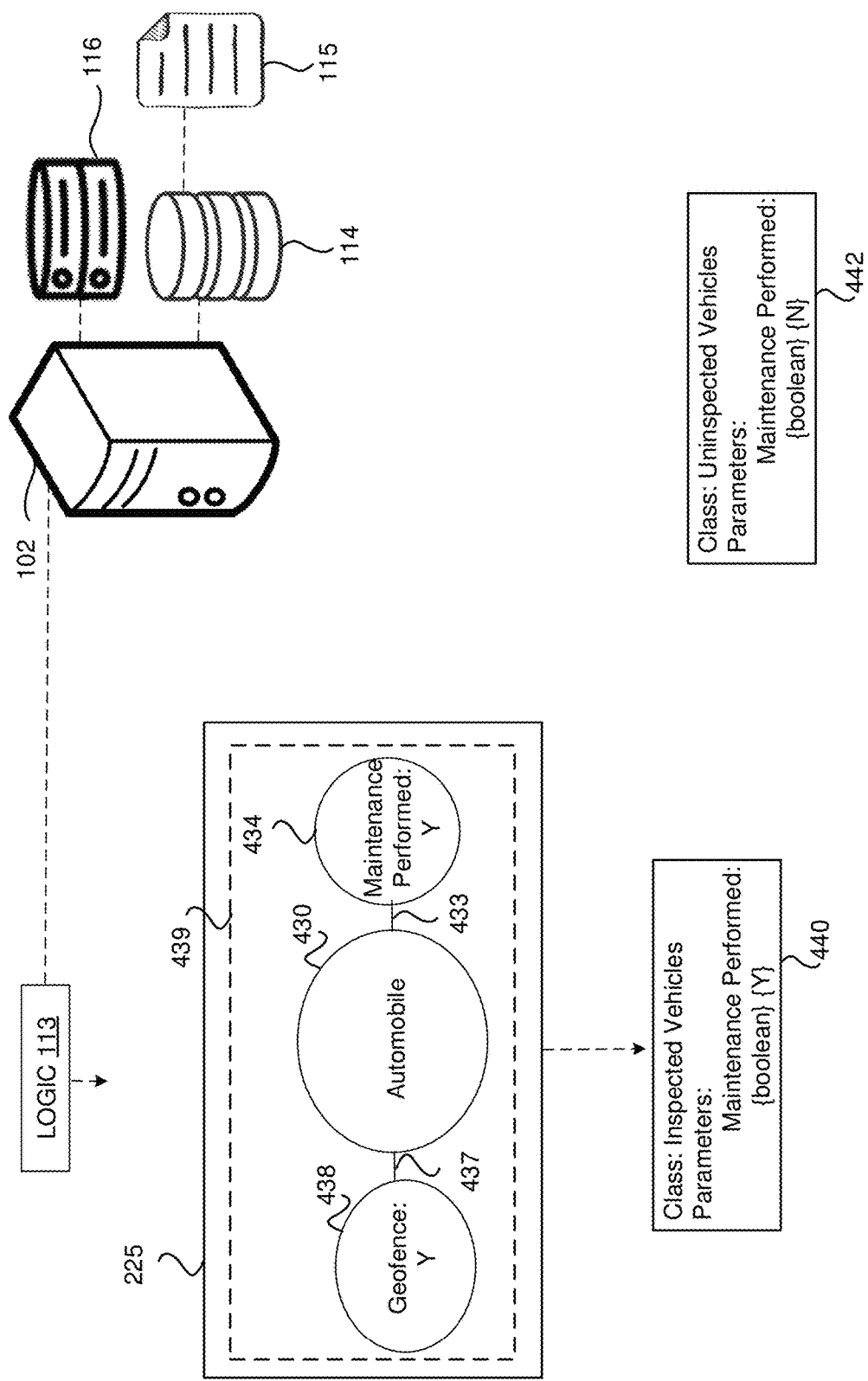
FIG. 4B illustrates an example implementation of a first computing system synchronizing updates following a modification of the data object in FIG. 4A, consistent with FIGS. 1A, 1B, 1C, 2A, 2B, 2C, 3A, and 3B, in accordance with various embodiments.

FIG. 4B illustrates resynchronizing the data object 130 to the first ontology 225 as a result of the modification illustrated in FIG. 4A. In particular, because of the generation of the updated ontological representation 439, a previous class 442 identified as "Uninspected Vehicles" which was satisfied by the ontological representation 429 may no longer be satisfied by the updated ontological representation 439. In particular, the updated ontological representation 439 may indicate that the attribute 434 corresponding to "Maintenance Performed" has a Boolean of "Y," indicating that maintenance has been performed. Because the class 442 requires that a Boolean corresponding to "Maintenance Performed" to be "N," or that maintenance has not been performed, the attribute 434 of the updated ontological representation 439 no longer satisfies the requirements of the class 442. The updated ontological representation 439 now satisfies the requirements of a class 440, which requires that the Boolean corresponding to "Maintenance Performed" to be "Y." Therefore, any instances of the data object 430 may be moved from the class 442 to the class 440 as a result of the updated ontological representation 439.

In some embodiments, instances of the data object 430, if they were previously present in the class 442, may be removed or purged. In other alternative embodiments, the instances of the data object 430 may still be retained within the class 442, but the timestamps and indices may not be updated, thereby indicating that those instances are not the most updated versions of the data object 430. Updates to existing data objects that occur within the first computing system 102 may also be synchronized to the second computing system 122 in a same or similar manner described in FIGS. 4A and 4B. Additionally, updates to the second ontology 325 may be processed in a same or similar manner as those applied to the first ontology 225. Therefore, following updates to data objects such as the data object 430, not only are instances of the data object 430 updated across different databases, but the first ontology 225, the second ontology 325, and/or any external ontologies that include instances of the data object 430, are also updated. In such a manner, different computing systems may collaborate and share updates, which may streamline operations.

Figure 5:
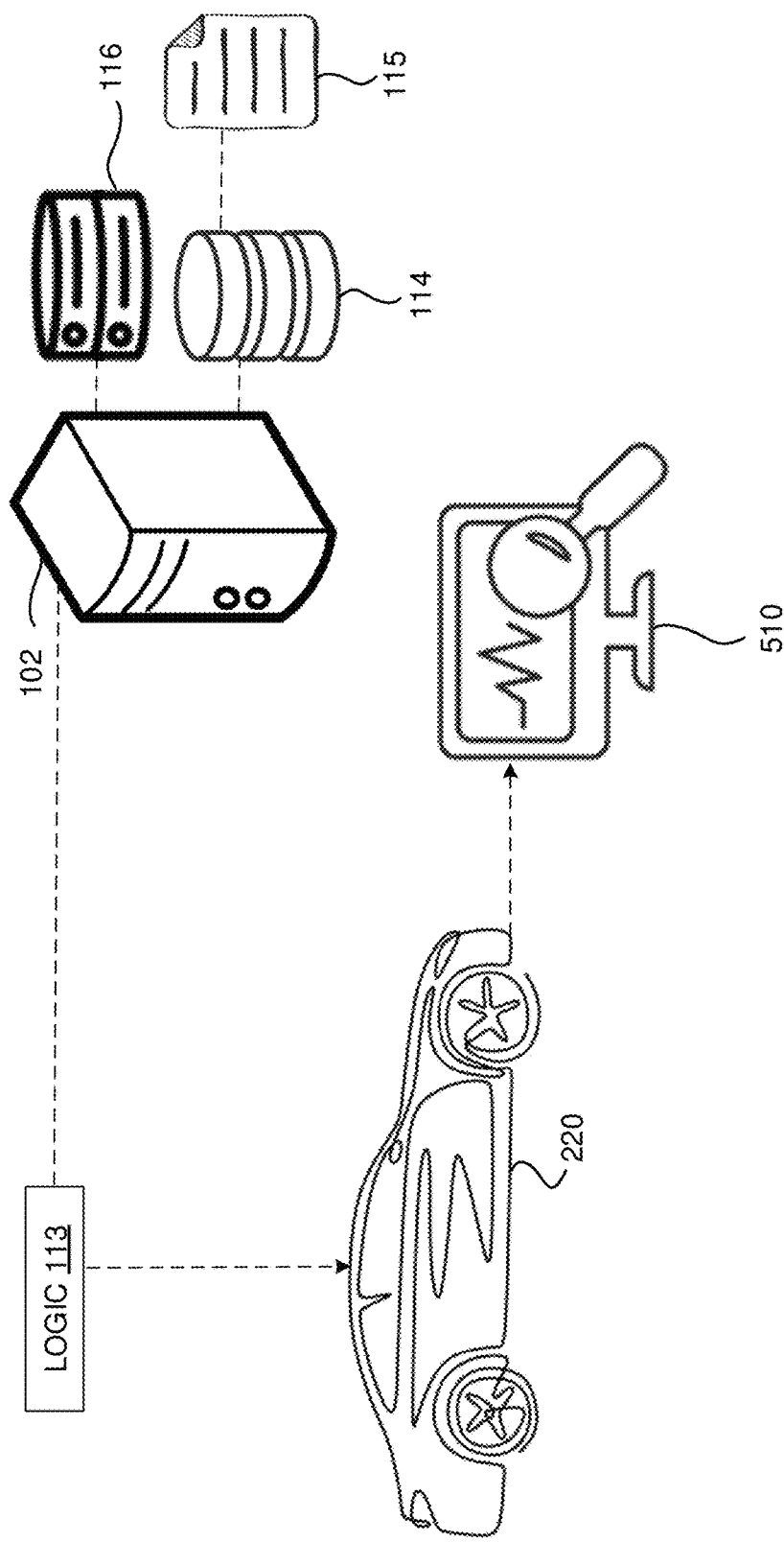
FIG. 5 illustrates an example implementation of a first computing system performing downstream actions following the synchronization of a data object across different databases, consistent with FIGS. 1A, 1B, 1C, 2A, 2B, 2C, 3A, and 3B, 4A, and 4B, in accordance with various embodiments.

FIG. 5 illustrates an exemplary embodiment, demonstrating downstream actions to be performed following, or in response to, synchronizing of a data object, such as incorporating a data object into an ontology. For example, following the incorporation of the data object 230 into the first ontology 225 and/or the second ontology 325, as illustrated in FIGS. 2A, 2B, 3C, 3A, and 3B, or following a modification to the data object 430, as illustrated in FIGS. 4A and 4B, the logic 113 may implement further downstream actions either at the first computing system 102, at the second computing system 122, and/or at external computing systems that have also incorporated the data object 230. These downstream actions may include data processing, analysis, monitoring, and/or alerting associated with the data object 230 or 430, and/or an entity, in this case the automobile 220, associated with the data object 230 or 430. In particular, the logic 113 may perform monitoring to generate a log 510. The log 510 may include a maintenance log, a modification log, a history, and/or metrics of or associated with the automobile 220. The monitoring may encompass adaptive monitoring, in which data such as performance data is compared to a threshold or threshold range. If the data falls outside a permitted threshold or permitted threshold range, then additional data may be collected. Otherwise, less data may be collected, or the collection of data may cease unless an alert is triggered. In other examples, assuming that the data object 230 or 430 corresponds to an actual physical entity (e.g. the automobile 220), other operations such as implementing maintenance on the automobile may be performed.

Figure 6:
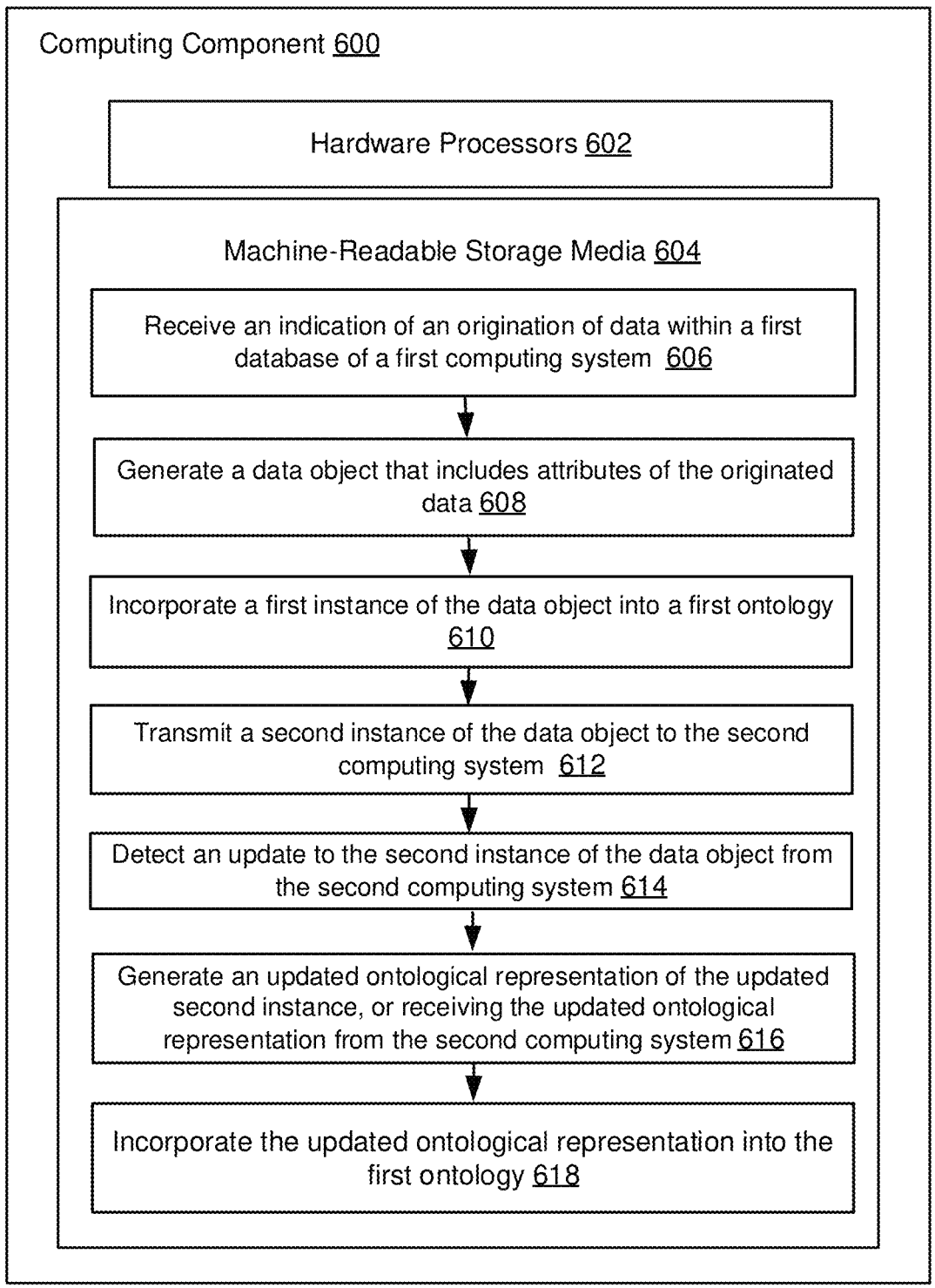
FIG. 6 illustrates a flowchart of an example method of synchronizing data across different computing systems at a first computing system, in accordance with various embodiments of the present technology.

FIG. 6 illustrates an exemplary flowchart, according to various embodiments of the present disclosure. A method described in the flowchart may be implemented in various environments including, for example, the environment 100 and/or the environment 101 of FIGS. 1A and 1B, respectively, and/or the implementation 105 of FIG. 1C. FIG. 6 illustrates a computing component 600 that includes one or more hardware processors 602 and machine-readable storage media 604 storing a set of machine-readable/machine-executable instructions that, when executed, cause the hardware processor(s) 602 to perform an illustrative method of synchronizing data and data updates across different computing systems. It should be appreciated that there can be additional, fewer, or alternative steps performed in similar or alternative orders, or in parallel, within the scope of the various embodiments discussed herein unless otherwise stated. The computing component 600 may be implemented as the first computing system 102 of FIGS. 1A, 1B, 1C, 2A, 2B, 2C, 3A, 3B, 4A, 4B, and 5. The computing component 600 may include a server. The machine-readable storage media 604 may include suitable machine-readable storage media described in FIG. 7, and/or the machine-readable storage media 112 of FIGS. 1A and 1B.

In step 606, the hardware processor(s) 103 may execute machine-readable/machine-executable instructions stored in the machine-readable storage media 604 to receive an indication of an origination of data within a first database (e.g., the first database 114) of the first computing system (e.g., the first computing system 102). In step 608, the hardware processor(s) 103 may execute machine-readable/machine-executable instructions stored in the machine-readable storage media 604 to generate a data object (e.g., the data object 150 in FIGS. 1A and 1C, and/or the data object 230 in FIGS. 2A, 2B, 2C, 3A, 3B, 4A, 4B, and 5) that includes attributes of the originated data. In step 610, the hardware processor(s) 103 may execute machine-readable/machine-executable instructions stored in the machine-readable storage media 604 to incorporate a first instance of the data object into a first ontology (e.g., the first ontology 225 of FIGS. 2A, 2B, 2C, and 4B of the first database 114). In step 612, the hardware processor(s) 103 may execute machine-readable/machine-executable instructions stored in the machine-readable storage media 604 to transmit a second instance of the data object to the second computing system (e.g., the second computing system 122). The transmission includes incorporating the second instance of the data object into a second ontology (e.g., the second ontology 325 of FIGS. 3A, 3B, and 4A) of a second database (e.g., the second database 124) within the second computing system. The second instance may be incorporated based on access control restrictions or requirements within the second database. For example, if the second database restricts viewing of a particular attribute, that particular attribute may be deleted or redacted within the second instance. Meanwhile, if the second database restricts writing of a data object or of a particular attribute, corresponding restrictions may be applied to the second instance. Additionally, the transmission includes generating a timestamp indicating a time at which the second instance was incorporated. In step 614, the hardware processor(s) 103 may execute machine-readable/machine-executable instructions stored in the machine-readable storage media 604 to detect an update to the second instance of the data object from the second computing system, for example, by detecting an update or change to the timestamp, or a new timestamp. The update may occur at, or correspond to, dynamic attributes, as illustrated in FIGS. 4A and 4B. In step 616, the hardware processor(s) 103 may execute machine-readable/machine-executable instructions stored in the machine-readable storage media 604 to generating an updated ontological representation of the updated second instance, or receiving the updated ontological representation from the second computing system. For example, the updated ontological representation may be shown as the updated ontological representation 439 in FIG. 4B. In step 618, the hardware processor(s) 103 may execute machine-readable/machine-executable instructions stored in the machine-readable storage media 604 to incorporate the updated ontological representation into the first ontology.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 7:
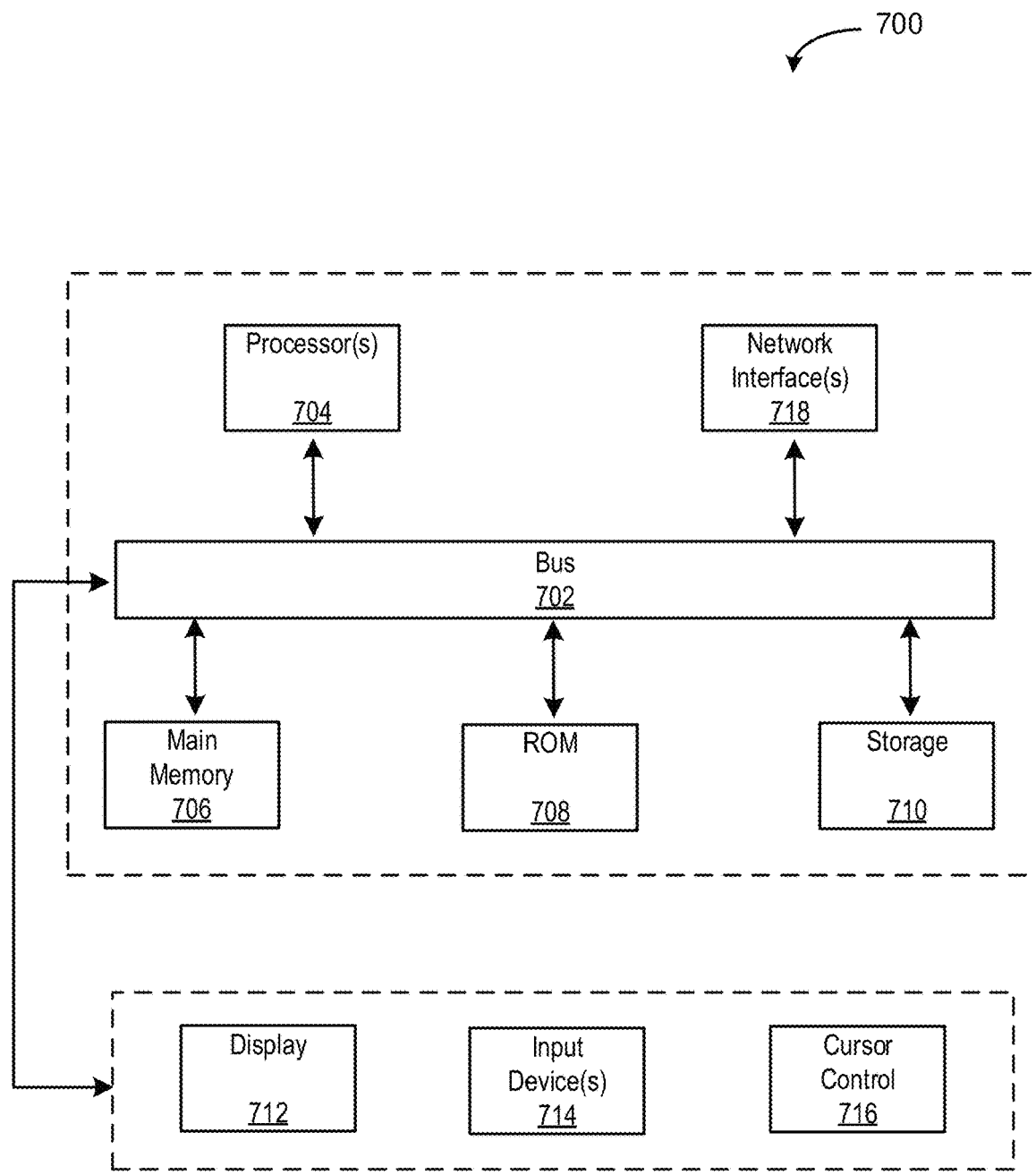
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The invention claimed is:

1. A first computing system that synchronizes data with a second computing system, the first computing system comprising:
    one or more processors;
    a first database; and
    memory storing instructions that, when executed by the one or more processors, cause the system to perform:
        receiving an indication of an origination of data within the first database of the first computing system;
        generating a data object that comprises attributes of the originated data;
        writing a first copy of the data object into a first ontology of the first database, wherein the first ontology indicates properties or constraints of data objects within the first database;
        writing a second copy of the data object into a second ontology of the second computing system, wherein the second ontology indicates properties or constraints of data objects within the second database, the writing of the second copy of the data object comprising:
            in response to the second copy of the data object being incompatible with the second ontology, selectively modifying a format of the second copy of the data object to conform to the second ontology;
        detecting an update to the selectively modified format of the second copy of the data object, wherein the update is associated with a change in an attribute;
        generating an updated ontological representation according to the update to the selectively modified format of the second copy, or receiving the updated ontological representation from the second computing system; and
        writing, into the first ontology of the first database, updated data corresponding to incorporating the updated ontological representation into the first ontology.

2. The computing system of claim 1, wherein the first ontology indicates first relationships among first data objects within the first database or first properties of the first data objects and the second ontology indicates second relationships among second data objects within the second database or second properties of the second data objects; and the incorporation of the first instance of the data object into the first ontology of the first database comprises determining a class satisfied by conditions indicated by the attributes based on an inheritance hierarchy of the first database and incorporating the first instance of the data object into the class.

3. The computing system of claim 1, wherein the incorporation of the second instance of the data object into the second ontology of the second database comprises:
    generating a timestamp indicating a time at which the second instance was incorporated into the second ontology; and generating an index corresponding to the timestamp, wherein the timestamp and the index are updated in response to the second instance being updated.

4. The computing system of claim 3, wherein the incorporation of the second instance of the data object into the second ontology of the second database comprises:
   generating a timestamp indicating a time at which the second instance was incorporated into the second ontology; and
   generating an index corresponding to the timestamp, wherein the timestamp is updated in response to the second instance being updated.

5. The computing system of claim 4, wherein the detecting of the update to the second instance is in response to the timestamp being changed.

6. The computing system of claim 2, wherein the incorporation of the second instance of the data object into the second ontology of the second database comprises:
   determining, based on a second inheritance hierarchy of the second ontology or based on differences between the first ontology and the second ontology, a second class within the second ontology satisfied by the conditions indicated by the attributes; and
   incorporating the second instance of the data object into the second class.

7. The computing system of claim 2, wherein the updated ontological representation comprises a mapping of updated attributes to the second instance of the data object.

8. The computing system of claim 7, wherein the incorporation of the updated ontological representation comprises:
   determining whether the class is still satisfied by updated conditions indicated by the updated attributes; and
   in response to determining that the class is no longer satisfied by the updated conditions:
      determining an updated class that is satisfied by the updated conditions; and
      incorporating an instance of the updated data object into the updated class.

9. The computing system of claim 8, wherein the incorporation of the updated ontological representation comprises:
   deleting the first instance of the data object within the class in response to determining that the class is no longer satisfied by the updated conditions.

10. The computing system of claim 1, wherein the instructions further cause the system to:
   perform a downstream action on the second instance of the data object, the downstream action comprising one of processing, analysis, and monitoring of an entity associated with the data object.

11. The computing system of claim 1, wherein the reception of the indication that the data within the first computing system has been updated is in response to a performance of a computing task by the first computing system.

12. A computer-implemented method of a first computing system that synchronizes data with a second computing system, the computer-implemented method comprising:
   receiving an indication of an origination of data within the first database of the first computing system;
   generating a data object that comprises attributes of the originated data;
   writing a first copy of the data object into a first ontology of the first database, wherein the first ontology indicates properties or constraints of data objects within the first database;
   writing a second copy of the data object into a second ontology of the second computing system, wherein the second ontology indicates properties or constraints of data objects within the second database, the writing of the second copy of the data object comprising:
      in response to the second copy of the data object being incompatible with the second ontology, selectively modifying a format of the second copy of the data object to conform to the second ontology;
   detecting an update to the selectively modified format of the second copy of the data object, wherein the update is associated with a change in an attribute;
   generating an updated ontological representation according to the update to the selectively modified format of the second copy, or receiving the updated ontological representation from the second computing system; and
   writing, into the first ontology of the first database, updated data corresponding to the updated ontological representation.

13. The computer-implemented method of claim 12, wherein the first ontology indicates first relationships among first data objects within the first database or first properties of the first data objects and the second ontology indicates second relationships among second data objects within the second database or second properties of the second data objects; and the incorporation of the first instance of the data object into the first ontology of the first database comprises determining a class satisfied by conditions indicated by the attributes based on an inheritance hierarchy of the first database and incorporating the first instance of the data object into the class.

14. The computer-implemented method of claim 12, wherein the incorporation of the second instance of the data object into the second ontology of the second database comprises:
   generating a timestamp indicating a time at which the second instance was incorporated into the second ontology; and
   generating an index corresponding to the timestamp, wherein the timestamp and the index are updated in response to the second instance being updated.

15. The computer-implemented method of claim 14, wherein the incorporation of the second instance of the data object into the second ontology of the second database comprises:
   generating a timestamp indicating a time at which the second instance was incorporated into the second ontology; and
   generating an index corresponding to the timestamp, wherein the timestamp is updated in response to the second instance being updated.

16. The computer-implemented method of claim 15, wherein the detecting of the update to the second instance is in response to the timestamp being changed.

17. The computer-implemented method of claim 13, wherein the incorporation of the second instance of the data object into the second ontology of the second database comprises:
   determining, based on a second inheritance hierarchy of the second ontology or based on differences between the first ontology and the second ontology, a second class within the second ontology satisfied by the conditions indicated by the attributes; and
   incorporating the second instance of the data object into the second class.

18. The computer-implemented method of claim 13, wherein the updated ontological representation comprises a mapping of updated attributes to the second instance of the data object.

19. The computer-implemented method of claim 18, wherein the incorporation of the updated ontological representation comprises:
- determining whether the class is still satisfied by updated conditions indicated by the updated attributes; and
- in response to determining that the class is no longer satisfied by the updated conditions:
  - determining an updated class that is satisfied by the updated conditions; and
  - incorporating an instance of the updated data object into the updated class.

20. The computer-implemented method of claim 12, further comprising:
- performing a downstream action on the second instance of the data object, the downstream action comprising one of processing, analysis, and monitoring of an entity associated with the data object.

\* \* \* \* \*